(12) United States Patent
Papp et al.

(10) Patent No.: US 11,011,882 B2
(45) Date of Patent: May 18, 2021

(54) ULTRAFAST ELECTRO-OPTIC LASER

(71) Applicant: Government of the United States of America, as represented by the Secretary of Commerce, Gaithersburg, MD (US)

(72) Inventors: Scott Brian Papp, Boulder, CO (US); David Richard Carlson, Boulder, CO (US); Daniel Durand Hickstein, Boulder, CO (US); Scott Alan Diddams, Louisville, CO (US)

(73) Assignee: GOVERNMENT OF THE UNITED STATES OF AMERICA, AS REPRESENTED BY THE SECRETARY OF COMMERCE, Gaithersburg, MD (US)

(*) Notice: Subject to any disclaimer, the term of this patent is extended or adjusted under 35 U.S.C. 154(b) by 55 days.

(21) Appl. No.: 16/561,564

(22) Filed: Sep. 5, 2019

(65) Prior Publication Data

US 2020/0076149 A1 Mar. 5, 2020

Related U.S. Application Data

(60) Provisional application No. 62/727,289, filed on Sep. 5, 2018.

(51) Int. Cl.
*H01S 3/10* (2006.01)
*H01S 3/00* (2006.01)
(Continued)

(52) U.S. Cl.
CPC .............. *H01S 3/0092* (2013.01); *G02F 1/01* (2013.01); *G02F 1/03* (2013.01); *G02F 1/0344* (2013.01);
(Continued)

(58) Field of Classification Search
CPC .......... H01S 3/0085; H01S 3/005; H01S 3/10; H01S 3/0057; H01S 3/0078;
(Continued)

(56) References Cited

U.S. PATENT DOCUMENTS 9,653,868 B2 5/2017 Fermann et al.
9,905,999 B2 * 2/2018 Li .................... H01S 3/0085
(Continued)

OTHER PUBLICATIONS

David R. Carlson et al. "Ultrafast electro-optic light with subcycle control" Science 361, 1358-1363 Sep. 28, 2018 (Year: 2018).*

*Primary Examiner* — Tod T Van Roy
*Assistant Examiner* — Delma R. Fordé
(74) *Attorney, Agent, or Firm* — Office of Chief Counsel for National Institute of Standards and Technology

(57) ABSTRACT

An ultrafast electro-optic laser makes a stabilized comb and includes: a comb generator that produces a frequency comb; a dielectric resonant oscillator; a phase modulator in communication with the dielectric resonant oscillator; an intensity modulator in communication with the phase modulator; an optical tailor in communication with the comb generator and that produces tailored light; a filter cavity in communication with the intensity modulator; a pulse shaper in communication with the filter cavity; a highly nonlinear fiber and compressor in communication with the pulse shaper; an interferometer in communication with the optical tailor and that produces a difference frequency from the tailored light; and an electrical stabilizer in communication with the interferometer and the comb generator and that produces the stabilization signal with a stabilized local oscillator cavity that produces a stabilized local oscillator signal that is converted into the stabilization signal and communicated to the dielectric resonant oscillator.

20 Claims, 12 Drawing Sheets

(51) Int. Cl.
*H01S 3/11* (2006.01)
*G02F 1/01* (2006.01)
*G02F 1/03* (2006.01)
*G02F 1/35* (2006.01)
*G01J 1/16* (2006.01)
*G01J 3/02* (2006.01)
*G01J 9/02* (2006.01)

(52) U.S. Cl.
CPC .......... *H01S 3/0057* (2013.01); *H01S 3/0078* (2013.01); *H01S 3/10* (2013.01); *H01S 3/1106* (2013.01); *G01J 1/16* (2013.01); *G01J 3/02* (2013.01); *G01J 9/02* (2013.01); *G02F 1/0128* (2013.01); *G02F 1/35* (2013.01); *G02F 2203/26* (2013.01); *G02F 2203/56* (2013.01)

(58) Field of Classification Search
CPC .... H01S 3/0092; H01S 3/1301; H01S 3/1305; G02F 1/01; G02F 1/0121; G02F 1/0123; G02F 1/0102; G02F 1/011; G02F 1/0105; G02F 1/35–397; G02F 1/03–0344; G02F 2203/56; G02F 2203/26; G02F 2001/3542; G02B 26/02; G02B 26/06; G02B 5/20; G01J 1/16; G01J 3/02; G01J 9/02

See application file for complete search history.

(56) References Cited

U.S. PATENT DOCUMENTS

| | | | | |
|---|---|---|---|---|
| 10,048,567 | B2* | 8/2018 | Papp | G02F 1/0344 |
| 10,585,332 | B2* | 3/2020 | Plascak | G02F 1/353 |
| 2007/0229937 | A1* | 10/2007 | Josef Moeller | G02F 1/3534 |
| | | | | 359/326 |
| 2015/0029575 | A1* | 1/2015 | Hara | G02F 1/2252 |
| | | | | 359/279 |
| 2015/0236784 | A1* | 8/2015 | Vahala | H04B 10/503 |
| | | | | 398/115 |
| 2015/0372447 | A1* | 12/2015 | Song | H01S 3/0057 |
| | | | | 372/21 |
| 2016/0254646 | A1* | 9/2016 | Li | H01S 3/0627 |
| | | | | 372/32 |
| 2017/0012705 | A1* | 1/2017 | Vahala | H04L 7/0091 |

* cited by examiner

ULTRAFAST ELECTRO-OPTIC LASER

CROSS REFERENCE TO RELATED APPLICATIONS

The application claims priority to U.S. Provisional Patent Application Ser. No. 62/727,289 filed Sep. 5, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and with support from the Department of Defense, Defense Advanced Research Projects Agency DODOS program in the form of a Military Interdepartmental Purchase Request, the the Air Force Office of Scientific Research (AFOSR) under award no. FA9550-16-1-0016. The Government has certain rights in the invention. Licensing inquiries may be directed to the Technology Partnerships Office, NIST, Gaithersburg, Md., 20899; voice (301) 301-975-2573; email tpo@nist.gov.

BRIEF DESCRIPTION

Disclosed is an ultrafast electro-optic laser for making a stabilized comb, the ultrafast electro-optic laser comprising: a comb generator that produces a frequency comb and comprises: a dielectric resonant oscillator that: receives a stabilization signal; and produces a phase control signal from the stabilization signal; a phase modulator in communication with the dielectric resonant oscillator and that: receives continuous wave light; receives, from the dielectric resonant oscillator, a phase control signal; produces, from the continuous wave light and the phase control signal, phase modulated light; and produces a phase modulation signal; an intensity modulator in communication with the phase modulator and that: receives, from the phase modulator, the phase modulated light; receives an intensity control signal; and produces a frequency comb from the intensity control signal and the phase modulated light; an optical tailor in communication with the comb generator and that produces tailored light, the optical tailor comprising: a filter cavity in communication with the intensity modulator and that: receives the frequency comb from the intensity modulator; and produces filtered light from the frequency comb; a pulse shaper in communication with the filter cavity and that: receives the filtered light from the filter cavity; and produces shaped light from the filtered light; a highly nonlinear fiber and compressor in communication with the pulse shaper and that: receives the shaped light from the pulse shaper; and produces compressed light from the shaped light; a waveguide in communication with the highly nonlinear fiber and the compressor and that: receives the compressed light; and produces the tailored light from the compressed light; an interferometer in communication with the optical tailor and that produces a difference frequency from the tailored light, the interferometer comprising a frequency difference crystal that receives the tailored light; and an electrical stabilizer in communication with the interferometer and the comb generator and that produces the stabilization signal, the electrical stabilizer comprising: a stabilized local oscillator cavity that produces a stabilized local oscillator signal that is converted into the stabilization signal and communicated to the dielectric resonant oscillator.

Disclosed is a process for making a stabilized comb with an ultrafast electro-optic laser, the process comprising: producing, by a comb generator, a frequency comb by: receiving, by a dielectric resonant oscillator, a stabilization signal; and producing, by the dielectric resonant oscillator, a phase control signal from the stabilization signal; receiving, by a phase modulator in communication with the dielectric resonant oscillator, continuous wave light; receiving, by the phase modulator from the dielectric resonant oscillator, a phase control signal; producing, from the continuous wave light and the phase control signal, phase modulated light; and producing a phase modulation signal; receiving, by an intensity modulator in communication with the phase modulator, the phase modulated light; receiving, by the intensity modulator an intensity control signal; and producing, the frequency comb from the intensity control signal and the phase modulated light; producing, by an optical tailor in communication with the comb generator, tailored light by: receiving, a filter cavity in communication with the intensity modulator, the frequency comb from the intensity modulator; producing filtered light from the frequency comb; receiving, by a pulse shaper in communication with the filter cavity, the filtered light from the filter cavity; producing shaped light from the filtered light; receiving, by a highly nonlinear fiber and compressor in communication with the pulse shaper, the shaped light from the pulse shaper; producing compressed light from the shaped light; receiving, by a waveguide in communication with the highly nonlinear fiber and the compressor, the compressed light; and producing the tailored light from the compressed light; producing, by an interferometer in communication with the optical tailor, a difference frequency from the tailored light with a frequency difference crystal; and producing, by an electrical stabilizer in communication with the interferometer and the comb generator, the stabilization signal by: producing, by a stabilized local oscillator cavity, a stabilized local oscillator signal; converting the stabilized local oscillator signal into the stabilization signal; and communicated the stabilization signal to the dielectric resonant oscillator to make the stabilization signal.

BRIEF DESCRIPTION OF THE DRAWINGS

The following description should not be considered limiting in any way. With reference to the accompanying drawings, like elements are numbered alike.

DETAILED DESCRIPTION

Figure 1:
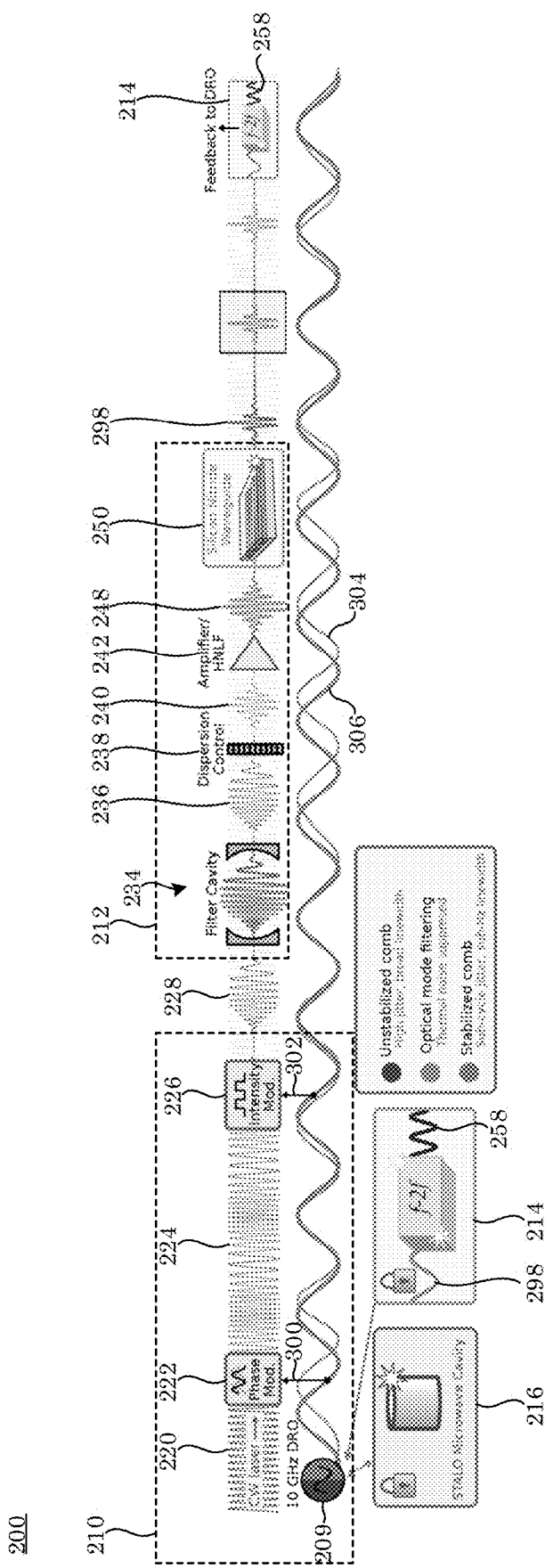
FIG. 1 shows an ultrafast electro-optic laser.

A detailed description of one or more embodiments is presented herein by way of exemplification and not limitation.

It has been discovered that an ultrafast electro-optic laser and processes described herein overcomes technical limitations of conventional apparatus in making a stabilized comb. The ultrafast electro-optic laser extends frontiers of physical measurements and enable techniques in areas such as chemistry, biology, information science, medicine, and manufacturing. Conventional ultrafast lasers involve mode-locked resonators, but the ultrafast electro-optic laser includes ultrastable control of femtosecond pulses based on electro-optic modulation of light. The ultrafast electro-optic laser produces unique, high-speed pulse trains with a rate up, e.g., to 30 GHz and provides sub-optical cycle timing precision with output spectra that spans from ultraviolet to near infrared.

The ultrafast electro-optic laser is an ultrafast light source that produces femtosecond pulses with sub-cycle timing jitter and includes electro-optic switching of a continuous-wave (cw) laser. The ultrafast electro-optic laser includes an electro-optic (EO) frequency comb; microwave-cavity stabilization to suppress electronic oscillator noise; an optical noise filtering cavity; a nanophotonic waveguide for broad spectrum generation; and an electronic feedback loop for microwave noise reduction via f-2f offset stabilization.

The ultrafast electro-optic laser has EO phase and intensity modulation of a cw laser to make a train of optical pulses driven directly by an electronic oscillator. The resulting frequency comb is spectrally broadened in a nanophotonic waveguide, and the ultrafast electro-optic laser generates ultrashort few-cycle pulses of light and self-referenced frequency stabilization and suppresses electronic noise of the comb at frequencies that can be, e.g., less than about 100 kHz. Electronic noise in the frequency range up to several megahertz is suppressed via locking the electronic oscillator to a narrow-linewidth microwave cavity and noise at frequencies extending up to the Nyquist frequency are filtered with the optical cavity. The ultrafast electro-optic laser reduces microwave noise that can limit conventional EO comb performance to below a noise of an optical carrier wave. Accordingly, the ultrafast electro-optic laser provides ultrastable timing precision of the pulse train.

Advantageously, the ultrafast electro-optic laser generates ultrashort pulses of light with extremely low timing and phase noise from cavity stabilization of a microwave electronic oscillator, a photonic waveguide for pulse compression and spectral broadening, and self-referencing of the comb for microwave phase noise reduction. Moreover, the ultrafast electro-optic laser produces pulses at a rate, e.g., greater than 10 GHz and fills a need for a stable high-repetition-rate comb source that can be used, e.g., in communications, spectroscopy, and real-time biological imaging as well as microscopy of a chemical or biological target.

The ultrafast electro-optic laser overcomes technical limitation of conventional apparatus and has a repetition rate that can be directly synchronized to a microwave drive at a same frequency. An optical phase of pulses from the ultrafast electro-optic laser can be controlled relative to a pulse repetition rate with sub-optical-cycle precision. A frequency domain spectrum of the pulses can be engineered to extend from the visible and near infrared spectrum, e.g., from 600 nm to 2400 nm. Moreover, a repetition rate and center wavelength of the ultrafast electro-optic laser can be selected.

Ultrafast electro-optic laser 200 makes stabilized comb 306. In an embodiment, with reference to FIG. 1 and FIG. 2, ultrafast electro-optic laser 200 includes comb generator 210 that produces frequency comb 228. Comb generator 210 includes dielectric resonant oscillator 290 that receives stabilization signal 288 and produces phase control signal 300 from stabilization signal 288; and phase modulator 222 in communication with dielectric resonant oscillator 290 and that receives continuous wave light 220; receives, from dielectric resonant oscillator 290, phase control signal 300; produces, from continuous wave light 220 and phase control signal 300, phase modulated light 224; and produces phase modulation signal 308. Comb generator 210 also includes intensity modulator 226 in communication with phase modulator 222 and that receives, from phase modulator 222, phase modulated light 224; receives intensity control signal 302; and produces frequency comb 228 from intensity control signal 302 and phase modulated light 224. Ultrafast electro-optic laser 200 also includes optical tailor 212 in communication with comb generator 210 and that produces tailored light 298. Optical tailor 212 includes filter cavity 234 in communication with intensity modulator 226 that receives frequency comb 228 from intensity modulator 226 and produces filtered light 236 from frequency comb 228. Pulse shaper 238 is in communication with filter cavity 234 and receives filtered light 236 from filter cavity 234 and produces shaped light 240 from filtered light 236. Highly nonlinear fiber 242 and compressor 246 are in communication with pulse shaper 238 and receive shaped light 240 from pulse shaper 238 and produce compressed light 248 from shaped light 240. Waveguide 250 is in communication with highly nonlinear fiber 242 and compressor 246 and receives compressed light 248 and produces tailored light 298 from compressed light 248. Ultrafast electro-optic laser 200 also includes interferometer 214 in communication with optical tailor 212 and that produces difference frequency 258 from tailored light 298. Interferometer 214 includes frequency difference crystal 256 that receives tailored light 298. Electrical stabilizer 216 is in communication with interferometer 214 and comb generator 210 and produces stabilization signal 288. Electrical stabilizer 216 includes stabilized local oscillator cavity 280 that produces stabilized local oscillator signal 282, which is converted into stabilization signal 288 that is communicated to dielectric resonant oscillator 290 from electrical stabilizer 216.

In an embodiment, ultrafast electro-optic laser 200 includes continuous wave laser 218 in communication with phase modulator 222 and that produces continuous wave light 220. Lock cavity 292 can be in communication with continuous wave laser 218 to produce lock signal 294 to which continuous wave laser 218 is locked.

In an embodiment, phase shifter 286 is in communication with dielectric resonant oscillator 290 and phase modulator 222 and can be electronically interposed between dielectric resonant oscillator 290 and phase modulator 222 to receive phase control signal 300 from dielectric resonant oscillator 290 and to shift a frequency of phase control signal 300 before phase control signal 300 is received by phase modulator 222.

In an embodiment, phase shifter 286 is in communication with phase modulator 222 and intensity modulator 226 and can be electronically interposed between phase modulator 222 and intensity modulator 226 to receive phase modulation signal 308 from phase modulator 222 and to shift a frequency of phase modulation signal 308 to produce intensity control signal 302 from phase modulation signal 308 before intensity control signal 302 is received by intensity modulator 226.

According to an embodiment, amplifier 230 is in communication with intensity modulator 226 and filter cavity 234, optically interposed between intensity modulator 226 and filter cavity 234, and receives frequency comb 228 from intensity modulator 226; and amplifies frequency comb 228 to produce amplified light 232 from frequency comb 228 before frequency comb 228 is received by filter cavity 234 as amplified light 232.

In an embodiment, amplifier 230 is in communication with pulse shaper 238 and highly nonlinear fiber 242, optically interposed between pulse shaper 238 and highly nonlinear fiber 242, and receives shaped light 240 from pulse shaper 238; and amplifies shaped light 240 to produce amplified light 232 from shaped light 240 before amplified light 232 is received by shaped light 240 as amplified light 232.

In an embodiment, electrical stabilizer 216 also includes filter 260 in communication with frequency difference crystal 256 and that: receives difference frequency 258 from frequency difference crystal 256; and passes only difference frequency 258 into electrical stabilizer 216 from frequency difference crystal 256. Clock 270 produces clock signal 310. Oscillator 272.2 is in communication with clock 270 and receives clock signal 310 from clock 270 and produces oscillator signal 274.4 from clock signal 310. Mixer 264.1 is in communication with filter 260 and second oscillator 272.2 and receives difference frequency 258 from filter 260; receives oscillator signal 274.4 from oscillator 272.2; and produces mixed signal 312.1 from oscillator signal 274.4 and difference frequency 258. Band pass filter 266 is in communication with mixer 264.1 and receives mixed signal 312.1 from mixer 264.1; and produces band pass signal 314 from mixed signal 312.1. Divider 268 is in communication with band pass filter 266 and receives band pass signal 314 from band pass filter 266; and produces oscillator signal 274.2 from band pass signal 314. Oscillator 272.1 is in communication with clock 270 and receives clock signal 310 from clock 270; and produces oscillator signal 274.1 from clock signal 310. Mixer 264.2 is in communication with divider 268 and oscillator 272.2 and receives oscillator signal 274.1 from oscillator 272.1; receives oscillator signal 274.2 from divider 268; and produces oscillator signal 274.3 from oscillator signal 274.1 and oscillator signal 274.2.

Servo 276.1 is in communication with mixer 264.2 and receives oscillator signal 274.3 from mixer 264.2; produces servo signal 316 and set point 278.1 from oscillator signal 274.3; and communicates servo signal 316 to stabilized local oscillator cavity 280, from which a temperature of stabilized local oscillator cavity 280 is controlled. Phase shifter 286.1 is in communication with dielectric resonant oscillator 290 and receives phase control signal 300 from dielectric resonant oscillator 290 and shifts a frequency of phase control signal 300 before phase control signal 300 is received by mixer 264.3. Mixer 264.3 is in communication with circulator 284 and dielectric resonant oscillator 290 via phase shifter 286.1 and receives phase control signal 300 from phase shifter 286; receives circulator signal 318 from circulator 284; mixes phase control signal 300 and circulator signal 318; and produces mixed signal 312.3 from phase control signal 300 and circulator signal 318. Servo 276.2 is in communication with mixer 264.3 and servo 276.1 and receives set point 278 from servo 276.1; receives mixed signal 312.3 from mixer 264.3; and produces stabilization signal 288, which is communicated comb generator 210, from set point 278 and mixed signal 312.3.

In ultrafast electro-optic laser 200, comb generator 210 includes elements to produce frequency comb 228 from inputs such as continuous wave light 220 and stabilization signal 288. It is contemplated that continuous wave laser 218 can include lasers with a narrow linewidth and high-speed frequency control bandwidth. Exemplary continuous wave lasers 218 include semiconductor-based lasers assembled from discrete elements, or heterogeneously integrated, semiconductor-based lasers fabricated with semiconductor processing techniques, or doped-fiber-based lasers. Moreover, laser 218 features an output with a single frequency of light, a narrow linewidth, high-power, and a single polarization of the electromagnetic field. In an embodiment, continuous wave laser 218 includes a laser with 1 kHz linewidth and 10 mW output power.

Continuous wave laser 218 produces continuous wave light 220. Continuous wave light 220 can include light guided in single mode, polarization-maintaining optical fiber, single mode optical fiber, or light propagating in free space. Exemplary continuous wave lights 220 include light of a single frequency that is guided in a polarization maintaining fiber coupled together with angled physical contact fiber optic (FC/APC) connectors. A wavelength of continuous wave light 220 can be from 300 nm to 20,000 nm, specifically from 500 nm to 2500 nm, and more specifically from 1500 nm to 1600 nm. A power of continuous wave light 220 can be from 1 mW to 100 mW, specifically from 25 mW to 50 mW, and more specifically from 40 mW to 50 mW. Power can refer to the number of photons per second in a single mode of the electromagnetic field. In an embodiment, continuous wave light 220 includes light with a single frequency, a single linear polarization, and a single spatial mode profile that is guided in a single mode polarization maintaining optical fiber with FC/APC connectorization.

Phase modulator 222 can include a modulator or series of modulators that vary the instantaneous phase of continuous wave light 220. Exemplary phase modulators 222 include modulators in which light propagates in free space or modulators in which light propagates in a guided mode, which can be implemented with a circular cross section waveguide, a rectangular cross section waveguide, or a photonic-crystal waveguide. The phase modulator may be implemented with a traveling wave mode, a traveling wave resonator mode, or a standing wave mode. The modulator may either accept free-space light or light in a guided mode. Moreover, the modulator can include low loss of light 220 and high conversion efficiency of the phase control signals 300 into modulation of the light 220. It is contemplated that the modulator efficiency can be described by the half-wave voltage and the modulator loss can be described in decibels of light power. Furthermore, the phase modulator can include a lithium niobate device, a silicon-on-insulator device, a lithium tantalate device, or a tantalum pentoxide device. Phase modulators 222 can be optically disposed serially in ultrafast electro-optic laser 200 and can receive independent phase control signals 300. The half-wave voltage of phase modulator 222 can be from 0.001 Volts to 5 Volts, specifically from 0.1 Volts to 3 Volts, and more specifically from 1 Volts to 3 Volts. The loss of phase modulator 222 can be from 0.1 dB to 5 dB and more specifically from 1 dB to 3 dB. In an embodiment, phase modulator 222 includes a fiber-coupled, lithium-niobate waveguide phase modulator.

Phase modulated light 224 can include light with an instantaneous phase modulation that corresponds to a low phase noise electronic signal. A wavelength of phase modulated light 224 can be from 300 nm to 20,000 nm, specifically from 500 nm to 2500 nm, and more specifically from 1500 nm to 1600 nm. A power of phase modulated light 224 can be from 1 mW to 100 mW. A duty cycle of phase modulated light 224 can be from 0% to 100%, specifically from 10% to 100%. The frequency of the phase modulation can be from 1 GHz to 50 GHz, specifically from 1 GHz to 30 GHz. In an embodiment, phase modulated light 224 includes a 1550 nm laser with 8 pi radians of phase modulation applied at a frequency of 10 GHz.

Intensity modulator 226 can include a modulator or series of modulators that vary the instantaneous intensity of light 224. Exemplary intensity modulators 226 include modulators in which light propagates in free space or modulators in which light propagates in a guided mode, which may be implemented with a circular cross section waveguide, a rectangular cross section waveguide, or a photonic-crystal waveguide. Moreover, intensity modulators can be implemented in a Mach Zehnder configuration, or with electro absorption, or with an optical resonator that is tuned with an electronic signal. The half-wave voltage of intensity modulator 226 can be from 0.001 Volts to 5 Volts, specifically from 0.1 Volts to 3 Volts, and more specifically from 1 Volts to 3 Volts. The loss of intensity modulator 226 can be from 0.1 dB to 5 dB and more specifically from 1 dB to 3 dB. The bandwidth of intensity modulator 226 can be from 1 Ghz to 50 GHz, specifically from 1 GHz to 30 GHz. In an embodiment, intensity modulator 226 includes a fiber coupled lithium niobate Mach Zehnder modulator.

Frequency comb 228 can result from phase modulation and intensity modulation of the continuous wave laser. The frequency comb 228 can include instantaneous intensity and phase modulation. The frequency comb can include modulation sidebands with a frequency separation given by the modulation control signals 300 and 302 and the phase and intensity modulator electro-optical conversion efficiencies.

Phase shifter 286 adjusts the phase or temporal delay of electronic signals that are applied to phase modulator 222 and intensity modulator 226. In an embodiment, phase shift 286 is a mechanical phase shifter with SMA connectors and less than 1 dB insertion loss.

Stabilization signal 288 can include an electronic signal communicated by an electronic wire for frequency stabilization of DRO 290 with respect to cavity 280. In an embodiment, signal 288 has a bandwidth from DC to 10 MHz.

Dielectric resonator oscillator (DRO) 290 can include an electronic oscillator that produces a low-phase-noise output frequency. The oscillation frequency of DRO 290 can be from 1 GHz to 50 GHz, and specifically from 1 GHz to 30 GHz. The output power of the DRO can be from 0 dBm to 40 dBm, specifically from 5 dBm to 15 dBm. In an embodiment, DRO produces a 10 GHz output frequency with phase noise of −137 dBm/Hz at 100 kHz and −158 dBm/Hz at 1 MHz.

Lock cavity 292 can include an optical frequency reference cavity. Exemplary lock cavities 292 can include ultralow expansion glass spacer cavities with low loss dielectric mirrors and bulk fused silica solid cylinder cavities with one plano endface and one convex endface and low loss dielectric mirror coatings applied to the endfaces. In an embodiment, lock cavity 292 is an evacuated Fabry Perot cavity implemented with fused silica mirror substrates with 10 ppm transmission dielectric reflector coatings for 1550 nm light, and the mirrors are supported by an ultralow expansion glass spacer with a 15 cm length.

lock signal 294 can include the feedback signal for frequency stabilization of the continuous wave laser 218 and continuous wave laser light 220 to the lock cavity 292.

Mirror 296 can include a metallic or dielectric reflecting surface.

Phase control signal 300 can include an electronic signal of wide bandwidth. In an embodiment, phase control signal 300 is a low phase noise single frequency microwave tone at 10 GHz or 30 GHz with a power level up to 36 dBm.

Intensity control signal 302 can include an electronic signal of wide bandwidth. In an embodiment, intensity control signal 302 is a low phase noise single frequency microwave tone at 10 GHz or 30 GHz with a power level up to 27 dBm.

Tailored light 298 can include light with a wide bandwidth, high power, periodic structure in the temporal and frequency domains, and high spectral coherence. The wavelength of tailored light 298 can be from 300 nm to 30,000 nm, specifically from 500 nm to 3000 nm. In an embodiment, tailored light 298 contains a supercontinuum spanning from 780 nm to 2500 nm with 2000 mW of average power and a pulse repetition frequency of 10 GHz.

Amplifier 230 can include an optical amplifier for the frequency comb light 228. Exemplary amplifiers 230 can include doped-fiber amplifiers and semiconductor amplifiers. In an embodiment, amplifier 230.1 is an erbium doped fiber amplifier with a maximum output power of 100 mW and a required input power of 1 mW. In an embodiment, amplifier 230.2 is an erbium doped fiber amplifier with a maximum output power of 5000 mW and a required input power of 1 mW.

Amplified light 232 can include frequency comb light 228 following optical amplification. Exemplary amplified light 232 can include light centered in the 1550 nm wavelength region and include intensity modulation and phase modulation. In an embodiment, amplified light 232 includes a 1550-nm-band laser with 100 mW of power and with 8 pi radians of phase modulation and 50% duty cycle intensity modulation applied at a frequency of 10 GHz.

Filter cavity 234 can include a standing-wave or traveling wave optical cavity. In an embodiment, filter cavity 234 is a Fabry-Perot cavity with a free-spectral range of 10 GHz, and a resonance linewidth of 2 MHz.

Filtered light 236 can include light with instantaneous phase and intensity modulation. A wavelength of filtered light 236 can be from 300 nm to 20,000 nm, specifically from 500 nm to 2500 nm, and more specifically from 1500 nm to 1600 nm. A power of filtered light 236 can be from 1 mW to 1000 mW. The frequency of the phase and intensity modulation can be from 1 GHz to 50 GHz, specifically from 1 GHz to 30 GHz. In an embodiment, filtered light 236 includes a 1550-nm-band laser with 50 mW of power and with 8 pi radians of phase modulation and 50% duty cycle intensity modulation applied at a frequency of 10 GHz.

Pulse shaper 238 can include a programmable optical filter with high frequency resolution to adjust the intensity and phase of each line of the frequency comb light 228. Exemplary pulse shapers can include those created with a spatial light modulator, using liquid crystal devices, or with a silicon photonics device.

Shaped light 240 can include light with instantaneous phase and intensity modulation. A wavelength of shaped light 240 can be from 300 nm to 20,000 nm, specifically from 500 nm to 2500 nm, and more specifically from 1500 nm to 1600 nm. A power of shaped light 240 can be from 1 mW to 1000 mW. The frequency of the phase and intensity modulation can be from 1 GHz to 50 GHz, specifically from 1 GHz to 30 GHz. In an embodiment, shaped light 240 includes a 1550-nm-band laser with 10 mW of power and with 8 pi radians of phase modulation and 50% duty cycle intensity modulation applied at a frequency of 10 GHz.

Highly nonlinear fiber 242 can include an optical fiber with sufficiently large third-order nonlinear coefficient. In an embodiment, highly nonlinear fiber 242 is five meters in length, includes GeO2 doped silica fiber with an operating wavelength of 1550 nm, with a group-velocity dispersion that is −1.3 ps/nm/km.

Optical coupler 244 can include a high numerical aperture lens to collimate the output of the highly nonlinear fiber 242.

Compressor 246 can apply a tunable quantity of second-order group-velocity dispersion. Exemplary compressors 246 include optical grating compressors, fiber Bragg grating compressors, optical fiber of a specific length, and programmable spatial light modulators. In an embodiment, compressor 246 is a diffraction grating pair with a tunable separation between the gratings in order to affect a change in the applied second-order group-velocity dispersion.

Compressed light 248 can include light with instantaneous phase and intensity modulation. A wavelength of compressed light 240 can be from 300 nm to 20,000 nm, specifically from 500 nm to 2500 nm, and more specifically from 1500 nm to 1600 nm. A power of shaped light 240 can be from 1 mW to 5000 mW. The frequency of the phase and intensity modulation can be from 1 GHz to 50 GHz, specifically from 1 GHz to 30 GHz. In an embodiment, compressed light 240 includes a 1550-nm-band laser with 4000 mW of power and with 8 pi radians of phase modulation and 50% duty cycle intensity modulation applied at a frequency of 10 GHz. The relative phase shift between the frequency-comb modes that provide compressed light 248 are set to zero to the extent possible by the system.

Waveguide 250 can include a chip-integrated nonlinear waveguide made from either silicon nitride or tantalum pentoxide that is deposited onto an oxidized silicon wafer. Waveguide 250 can include other materials, including silicon, GaAs, InGaAs, InP, and vanadium pentoxide. The waveguide 250 can include optimized chip-edge coupling structures that include a tapered waveguide region that enhances coupling efficiency to free-space optics or fiber optics. Furthermore, the input and output tapering structures can be different to optimize operation at different wavelength. Moreover, waveguide 250 can include a section designed for supercontinuum generation with an optimized rectangular cross section and a length from 1 mm to 10,000 mm, specifically 1 mm to 1000 mm, and more specifically 1 mm to 100 mm. Furthermore, waveguide 250 can include sections of differing rectangular cross section to separately optimize soliton compression effects and soliton fission or dispersive-wave generations effects. In an embodiment, waveguide 250 includes silicon nitride with silicon dioxide cladding. Waveguide 250 can have has tapered waveguide structures at both ends with waveguide height that is approximately 800 nm and width approximately 2000 nm with waveguide length that is 15 mm.

Mirror 252.1 can include a metallic or dielectric reflecting surface that is partially transmissive at one wavelength and fully transmissive at another wavelength.

Lens 254 can include a lens to couple light from a free space laser beam to a single mode optical fiber.

Second-harmonic generation crystal 256 can include a crystal designed to create second-harmonic light based on a second-order nonlinearity.

Difference frequency 258 can include the carrier-envelope offset frequency of ultrafast electro-optic laser 200. In an embodiment, difference frequency 258 is the difference in frequency between the second-harmonic of 1550-nm light emitted by waveguide 250 and the 780-nm light emitted by waveguide 250.

Exemplary photodetectors 260 include devices made from silicon and InGaAs. In an embodiment, photodetector 260 includes a silicon photodiode with transimpedance amplifier.

Electrical amplifier 262 includes a microwave frequency electronic amplifier.

Mixer 264 can include an electronic double balanced mixer.

Band pass filter 266 can include an electronic, frequency tunable bandpass filter with less than 50 MHz bandwidth. Exemplary filters include cavity filters and lumped element filters.

Divider 268 can include an electronic digital frequency divider that reduces the frequency of an electronic signal by an integer ratio. In an embodiment, divider 268 reduces the frequency of an input signal by a factor of 32.

Clock 270 can include an electronic oscillator that provides a frequency reference for the ultrafast electro-optic laser 200.

Oscillator 272 can include a RF oscillator that is phase stabilized to an input RF clock. Exemplary oscillators include direct-digital synthesis oscillators and phase locked voltage-controlled oscillators.

Oscillator signal 274 can include a sine-wave electronic signal with power level of 7 dBm.

Servo 276 can include a proportional, integral, and differential (PID) electronic servo controller.

Set point 278 can include an electronic voltage signal that is used as the reference for an electronic servo.

Stabilized local oscillator cavity 280 can include a high quality factor electronic resonant cavity consisting of a closed or mostly closed metal volume that stores microwave radiation. Cavity 280 includes input and output coupling ports with a coupling between a coaxial cable and the stored microwave radiation inside the cavity. Exemplary cavities include those constructed in the form of a circular cylinder or rectangular box, and those constructed of metals such as aluminum and copper and those in which the internal surface is coated with a metal like gold or platinum. The cavity may be highly polished on the internal surfaces to reduce scattering of the microwave radiation, and polishing may be obtained through precision machining, chemical vapor polishing, or mechanical polishing. The cavity may feature an insertable element designed to distort the internal microwave field shape and alter the resonant frequency of the cavity. In an embodiment, cavity 280 includes aluminum in which the internal surface has been precision machined and mechanically polished.

Stabilized local oscillator signal 282 can include microwave radiation that is incident upon the cavity 280.

Circulator 284 can include a passive, non-reciprocal microwave frequency device with three ports.

Phase modulation signal 308 can include a phase modulation of the signal incident upon the microwave cavity 280.

Clock signal 310 can include an electronic sine wave signal at a single frequency.

Mixed signal 312 can include the interference between the electronic signal from oscillator 290 and the output signal from cavity 280.

Band pass signal 314 can include an electronic signal that is output from the band pass filter 266.

Servo signal 316 can include an electronic servo signal, designed to actuate a temperature controller on cavity 280.

Circulator signal 318 can include an electronic signal obtained from the output port of circulator 284.

Un-stabilized comb 304 is the ultrafast electro-optic laser in which feedback to oscillator 290 has been disabled.

Stabilized comb 306 is the ultrafast electro-optic laser in which feedback to oscillator 290 has been enabled.

Ultrafast electro-optic laser 200 can be made in various ways. In an embodiment, a process for making ultrafast electro-optic laser 200 includes: disposing continuous wave laser 218 in optical communication with phase modulator 222 by polarization maintaining (PM) optical fiber; disposing phase modulator 222 in optical communication with intensity modulator 226 by PM optical fiber; disposing lock cavity 292 in optical communication with continuous wave laser 218 by PM optical fiber; disposing dielectric resonant oscillator 290 in electrical communication with phase modulator 222 by an electrical cable; disposing intensity modulator 226 in optical communication with amplifier 230.1 by an electrical cable; disposing amplifier 230.1 in optical communication with filter cavity 234 by an electrical cable; disposing filter cavity 234 in optical communication with pulse shaper 238 by PM optical fiber; disposing pulse shaper 238 in optical communication with amplifier 230.2 by optical fiber; disposing amplifier 230.2 in optical communication with highly nonlinear fiber 242 by optical fiber; disposing highly nonlinear fiber 242 in optical communication with compressor 246 by optical fiber and a free-space optical beam; disposing compressor 246 in optical communication with waveguide 250 by a free-space optical beam; disposing waveguide 250 in optical communication with frequency difference crystal 256 by a free-space optical beam; disposing frequency difference crystal 256 in optical communication with filter 260 by a free-space optical beam; disposing waveguide 250 in electrical communication with mixer 264.1 by a free-space optical beam; disposing clock 270 in electrical communication with oscillator 272.1 and oscillator 272.2 by an electrical cable; disposing mixer 264.1 in electrical communication with electrical amplifier 262.1 and oscillator 272.2 by an electrical cable; disposing waveguide 250 in electrical communication with mixer 264.1 by an electrical cable; disposing mixer 264.1 in electrical communication with band pass filter 266 by electronic cable; disposing band pass filter 266 in electrical communication with electrical amplifier 262.2 by an electronic cable rated for the microwave frequency range; disposing electrical amplifier 262.2 in electrical communication with divider 268 by an electronic cable rated for the microwave frequency range; disposing mixer 264.2 in electrical communication with oscillator 272.1 and divider 268 by an electronic cable rated for the microwave frequency range; disposing mixer 264.2 in electrical communication with servo 276.1 by an electronic cable rated for the microwave frequency range; disposing servo 276.1 in electrical communication with stabilized local oscillator cavity 280 and servo 276.2 by an electronic cable rated for the microwave frequency range; disposing stabilized local oscillator cavity 280 in electrical communication with circulator 284 by an electronic cable rated for the microwave frequency range; disposing circulator 284 in electrical communication with phase modulator 222 by an electronic cable rated for the microwave frequency range; disposing waveguide 250 in electrical communication with mixer 264.1 by an electronic cable rated for the microwave frequency range; disposing mixer 264.3 in electrical communication with circulator 284, phase shifter 286.1, and servo 276.2 by an electronic cable rated for the microwave frequency range; disposing phase shifter 286.1 in electrical communication with dielectric resonant oscillator 290 by an electronic cable rated for the microwave frequency range; and disposing servo 276.2 in electrical communication with dielectric resonant oscillator 290.1 by an electronic cable rated for the microwave frequency range.

Ultrafast electro-optic laser 200 has numerous advantageous and unexpected benefits and uses. In an embodiment, a process for making stabilized comb 306 with ultrafast electro-optic laser 200 includes: producing, by comb generator 210, frequency comb 228 by: receiving, by dielectric resonant oscillator 290, stabilization signal 288; and producing, by dielectric resonant oscillator 290, phase control signal 300 from stabilization signal 288; receiving, by phase modulator 222 in communication with dielectric resonant oscillator 290, continuous wave light 220; receiving, by phase modulator 222 from dielectric resonant oscillator 290, phase control signal 300; producing, from continuous wave light 220 and phase control signal 300, phase modulated light 224; and producing phase modulation signal 308; receiving, by intensity modulator 226 in communication with phase modulator 222, phase modulated light 224; receiving, by intensity modulator 226, intensity control signal 302; and producing, frequency comb 228 from intensity control signal 302 and phase modulated light 224; producing, by optical tailor 212 in communication with comb generator 210, tailored light 298 by: receiving, filter cavity 234 in communication with intensity modulator 226, frequency comb 228 from intensity modulator 226; producing filtered light 236 from frequency comb 228; receiving, by pulse shaper 238 in communication with filter cavity 234, filtered light 236 from filter cavity 234; producing shaped light 240 from filtered light 236; receiving, by highly nonlinear fiber 242 and compressor 246 in communication with pulse shaper 238, shaped light 240 from pulse shaper 238; producing compressed light 248 from shaped light 240; receiving, by waveguide 250 in communication with highly nonlinear fiber 242 and compressor 246, compressed light 248; and producing tailored light 298 from compressed light 248; producing, by interferometer 214 in communication with optical tailor 212, difference frequency 258 from tailored light 298 with frequency difference crystal 256; and producing, by electrical stabilizer 216 in communication with interferometer 214 and comb generator 210, stabilization signal 288 by: producing, by stabilized local oscillator cavity 280, stabilized local oscillator signal 282; converting stabilized local oscillator signal 282 into stabilization signal 288; and communicated stabilization signal 288 to dielectric resonant oscillator 290 to make stabilization signal 288.

In the process for making stabilized comb 306, receiving, by dielectric resonant oscillator 290, stabilization signal 288 can include a signal obtained from a PID servo controller based on the interference of the microwave signal from oscillator 290 and the microwave signal at the output of cavity 280. This signal is electronically mixed in a double balanced mixer 264.

In the process for making stabilized comb 306, producing, by dielectric resonant oscillator 290, phase control signal 300 from stabilization signal 288 can include an amplified signal from oscillator 290 in which the relative phase of the microwave signals applied to phase modulators 222, 222.2, and 222.3 are aligned using phase shifters 286.2 and 286.3.

In the process for making stabilized comb 306, receiving, by phase modulator 222 in communication with dielectric resonant oscillator 290, continuous wave light 220 can include laser light with a single frequency and a constant intensity.

In the process for making stabilized comb 306, receiving, by phase modulator 222 from dielectric resonant oscillator 290, phase control signal 300 can include an amplified signal from oscillator 290 in which the relative phase of the microwave signals applied to phase modulators 222, 222.2, and 222.3 are aligned using phase shifters 286.2 and 286.3.

In the process for making stabilized comb 306, producing, from continuous wave light 220 and phase control signal 300, phase modulated light 224 can include continuous light 220 with the application of phase modulation sidebands at the microwave frequency of oscillators 290 and with a phase modulation index given by the power of microwave radiation 300 applied to the modulator and the phase modulation efficiency of phase modulator 222.

In the process for making stabilized comb 306, producing phase modulation signal 308 can include signal 300 after it has passed through phase modulator 222.3.

In the process for making stabilized comb 306, receiving, by intensity modulator 226 in communication with phase modulator 222, phase modulated light 224 can include continuous light 220 with the application of phase modulation sidebands at the microwave frequency of oscillators 290 and with a phase modulation index given by the power of microwave radiation 300 applied to the modulator and the phase modulation efficiency of phase modulator 222.

In the process for making stabilized comb 306, receiving, by intensity modulator 226 intensity control signal 302 can include a microwave frequency signal that is derived from oscillator 290 and whose phase is adjusted with shifter 286.4 to be aligned with the phase of signals 300 applied to phase modulators 222, 222.2, and 222.3 and whose power is adjusted to provide a 50% duty cycle intensity modulation of light 224.3.

In the process for making stabilized comb 306, producing, frequency comb 228 from intensity control signal 302 and phase modulated light 224 can include continuous wave light 220 with the application of phase modulation and a 50% duty cycle intensity modulation at the frequency of oscillator 290.

In the process for making stabilized comb 306, receiving, filter cavity 234 in communication with intensity modulator 226, frequency comb 228 from intensity modulator 226 can include a Fabry Perot optical cavity of two mirrors in which the medium between the mirrors is filled with air, vacuum, or a low-loss optical material. The linewidth of the Fabry-Perot cavity must be less than approximately 10 MHz. The free-spectral range of the cavity must be aligned to the frequency of oscillator 290. The resonance frequency of one filter cavity mode must be aligned to the continuous wave laser 218.

In the process for making stabilized comb 306, producing filtered light 236 from frequency comb 228 can include light 232.1 after passing through the filter cavity. Light 236 has been filtered by the filter cavity 234 such that the intensity of radiation about each mode of the frequency comb light 228 and outside the bandwidth of the filter cavity 234 is attenuated.

In the process for making stabilized comb 306, receiving, by pulse shaper 238 in communication with filter cavity 234, filtered light 236 from filter cavity 234 can include a programmed line-by-line optical filter that enables intensity and phase control of each mode of the frequency comb light 228 that is received from the filter cavity 236. Line-by-line intensity and phase control enables generation of a compressed pulse in which the relative phase difference between the frequency comb modes is zero.

In the process for making stabilized comb 306, producing shaped light 240 from filtered light 236 can include adjustment and alignment of the phases of the comb modes produced by phase modulation and intensity modulation such that the relative line-by-line relative phase is zero.

In the process for making stabilized comb 306, receiving, by highly nonlinear fiber 242 and compressor 246 in communication with pulse shaper 238, shaped light 240 from pulse shaper 238 can include shaping the pulse incident on element 242 such that the pulse is compressed to its maximum peak intensity including the effects of amplifier 230.2.

In the process for making stabilized comb 306, producing compressed light 248 from shaped light 240 can include adjusting the applied second order dispersion with grating compressor 246 by adjusting the relative separation of the grating pair.

In the process for making stabilized comb 306, receiving, by waveguide 250 in communication with highly nonlinear fiber 242 and compressor 246, compressed light 248 can include a pulse that is temporally compressed to achieve its high peak intensity.

In the process for making stabilized comb 306, producing tailored light 298 from compressed light 248 can include utilizing a waveguide to create a supercontinuum spectrum by soliton compression, soliton fission, and dispersive-wave generation.

In the process for making stabilized comb 306, producing, by interferometer 214 in communication with optical tailor 212, difference frequency 258 from tailored light 298 with frequency difference crystal 256 can include use of light 298 that contains components at approximately 1550 nm, which is frequency doubled to 780 nm, and 780 nm. Interference of the frequency doubled light and the approximately 780 nm light from element 298 is used to detect the carrier envelope offset frequency of the ultrafast electro-optic laser 200.

In the process for making stabilized comb 306, producing, by stabilized local oscillator cavity 280, stabilized local oscillator signal 282 can include the signal from the oscillator 290 after passing through phase modulator 222.3 and the cavity 280.

In the process for making stabilized comb 306, converting stabilized local oscillator signal 282 into stabilization signal 288 can include a phase quadrature comparison of the oscillator signal 290 and the signal that is output from the cavity 280. A double balanced mixer is used to perform the phase comparison between signal 308 and the oscillator 290.

In the process for making stabilized comb 306, communicating stabilization signal 288 to dielectric resonant oscillator 290 to make stabilization signal 288 can include use of a PID servo electronics to create the feedback signal 288 that is applied to oscillator 290.

The process for making stabilized comb 306 can include receiving, by phase shifter 286 in communication with dielectric resonant oscillator 290 and phase modulator 222, phase control signal 300 from dielectric resonant oscillator 290 by microwave amplification of the signal from oscillator 290 and coordinating application of phase shifts with phase shifters 286.

The process for making stabilized comb 306 can include receiving, by phase shifter 286 in communication with phase modulator 222 and intensity modulator 226, phase modulation signal 308 from phase modulator 222 by taking the signal 300 that is output from phase modulator 222.3, applying a phase shift, and applying it to intensity modulator 226.

The process for making stabilized comb 306 can include producing clock signal 310 by use of a suitable clock source as determined by the frequency stability needs of the ultrafast electro-optic laser 210.

The process for making stabilized comb 306 can include signal processing and PID servo stabilization of the carrier-envelope offset (CEO) frequency signal $f_0$. The CEO signal, a microwave-rate signal, may be amplified with amplifier 262.1, and it may be reduced in frequency with respect to an electronic oscillator 272.2 that is phase locked to clock 270 using an electronic frequency mixer 264.1, and it may be bandpass filtered by filter 266 in order to improve the signal to noise ratio, and it may be further amplified by amplifier 262.2, and it may be frequency divided by an integer ratio with digital frequency divider 268, and it is phase locked with respect to the reference oscillator 272.1 by servo feedback to the dielectric resonator oscillator 290. In a subsequent process step, the process for making stabilized comb 306 can include signal processing to further stabilize the dielectric resonator oscillator 290 by stabilization with respect to the cavity 280. Signal 308 emitted by phase modulator 222.3 is delivered to cavity 280 and the output signal 318 from cavity 280 is phase compared to oscillator 290. Signal 312.3, which represents the relative phase fluctuations of oscillator 290 and cavity 280 are used for servo stabilization of oscillator 290 with PID servo 276.2.

Ultrafast electro-optic laser 200 and processes disclosed herein have numerous beneficial uses, including high-speed linear and nonlinear spectroscopy of solid, liquid, and gas samples, for high speed ranging measurements, calibration of astronomical spectrographs, optical driving of particle accelerators, for microwave and millimeter wave signal generation, and high-speed optical communications systems. Advantageously, ultrafast electro-optic laser 200 overcomes limitations of technical deficiencies of conventional articles such as traditional mode locked laser technology that do not operate at microwave rates with the ease and simplicity of electro-optic lasers.

Ultrafast electro-optic laser 200 and processes herein unexpectedly provides stabilization of an electro-optic laser with sub-cycle accuracy and precision. Ultrafast electro-optic laser 200 is a stabilized ultrafast pulse source with sub-cycle accuracy and precision that does not involve mode locking.

The articles and processes herein are illustrated further by the following Example, which is non-limiting.

EXAMPLE

Ultrafast electro-optic light with subcycle control.

Generation of coherent optical frequency combs has had an impact on precision metrology, imaging, and sensing applications. Broadband white light generated through the interaction of femtosecond mode-locked laser pulses is composed of billions or trillions of precisely spaced wavelengths of light. An alternative to a mode-locked laser is electro-optic modulation of a continuous-wave laser light source that can generate optical frequency combs. The electro-optic modulation techniques can operate at much higher repetition rates than mode-locked lasers and yield more precise measurements.

Light sources that are ultrafast and ultrastable enable applications like timing with sub femtosecond precision and control of quantum and classical systems. Mode-locked lasers have often given access to this regime, by using their high pulse energies. The ultrafast electro-optic laser provides ultrastable control of low-energy femtosecond pulses based on common electro-optic modulation of a continuous-wave laser light source and provides 100-picojoule pulse trains at rates up to 30 gigahertz and demonstrate sub-optical cycle timing precision and output spectra spanning the near infrared. The ultrafast electro-optic laser provides few-cycle ultrafast pulses in an absence of mode locking and provides high speed access to nonlinear measurements and rapid transients.

Ultrafast lasers produce trains of femtosecond-duration light pulses and can operate as frequency combs to provide a time and frequency reference bridging the optical and microwave domains of the electromagnetic spectrum. Achieving phase control of these pulse trains to better than a single optical cycle has enabled diverse applications ranging from optical atomic clocks to controlling quantum states of matter. These capabilities involve stability of a suitable mode-locked resonator.

One alternative method that produces optical pulse trains without mode locking is electro-optic modulation (EOM) of a laser. These pulse generators, or EOM combs, have tunability, reliability, commercialization, and spectral flatness. Nevertheless, despite their broad appeal and decades of development, the fundamental goal of electronic switching with the optical-cycle precision are used to create ultrafast trains of EOM pulses and has remained unmet, limited by thermodynamic noise and oscillator phase noise inherent in electronics.

The ultrafast electro-optic laser generates ultrafast and ultrastable electro-optic pulses without any mode locking and mitigates electro-optic noise by relying on the quantum-limited optical processes of cavity transmission, nonlinear interferometry, and nonlinear optical pulse compression, as well as low-loss microwave interferometry. This results in phase control of ultrafast electro-optic fields with a temporal precision better than one cycle of the optical carrier. Because electro-optic sources support pulse repetition rates greater than 10 GHz, the ultrafast electro-optic laser opens up the regime of high-speed, ultrafast light sources, enabling sampling or excitation of high-speed transient events, as well as making precision measurements across octaves of bandwidth.

The ultrafast electro-optic laser has ultrafast phase control by directly carving electro-optic pulse trains at 10 and 30 GHz with ~1-ps initial pulse durations and show that these pulses can be spectrally broadened to octave bandwidths and temporally compressed to less than three optical cycles (15 fs) in nanophotonic silicon-nitride ($Si_3N_4$, henceforth SiN) waveguides. To deliver a femtosecond source timed with subcycle precision, an EOM-comb configuration implements high-Q microwave-cavity stabilization of the 10-GHz electronic oscillator. This oscillator is phase-locked to the continuous-wave (CW) pump source via f-2f stabilization of the carrier-envelope offset, enabling complete knowledge of the 28,000 EOM-comb frequencies to 17 digits. Our implementation uses a cavity-stabilized CW laser to demonstrate sub hertz-linewidth modes spanning the near infrared.

The EOM comb is derived from a microwave source that drives an intensity modulator placed in series with multiple phase modulators to produce a 50%-duty-cycle pulse train with mostly linear frequency chirp as shown in FIG. 1, FIG. 3, FIG. 4, and FIG. 5. In the spectral domain, this process results in a deterministic cascade of sidebands with prescribed amplitude and phase that converts the CW laser power into a frequency comb with a mode spacing given by the microwave driving frequency $f_{eo}$. The frequency of each resulting mode n, counted from the CW laser at frequency $v_p$, can then be expressed as $v_n = v_p \pm nf_{eo}$. Equivalently, the modes can be expressed as a function of the classic offset frequency $f_0$ and repetition rate $f_{rep}$ parameters as $v_n = f_0 + n'f_{rep}$, where now the mode number n' is counted from zero frequency and $f_{rep} = f_{eo}$.

Figure 3:
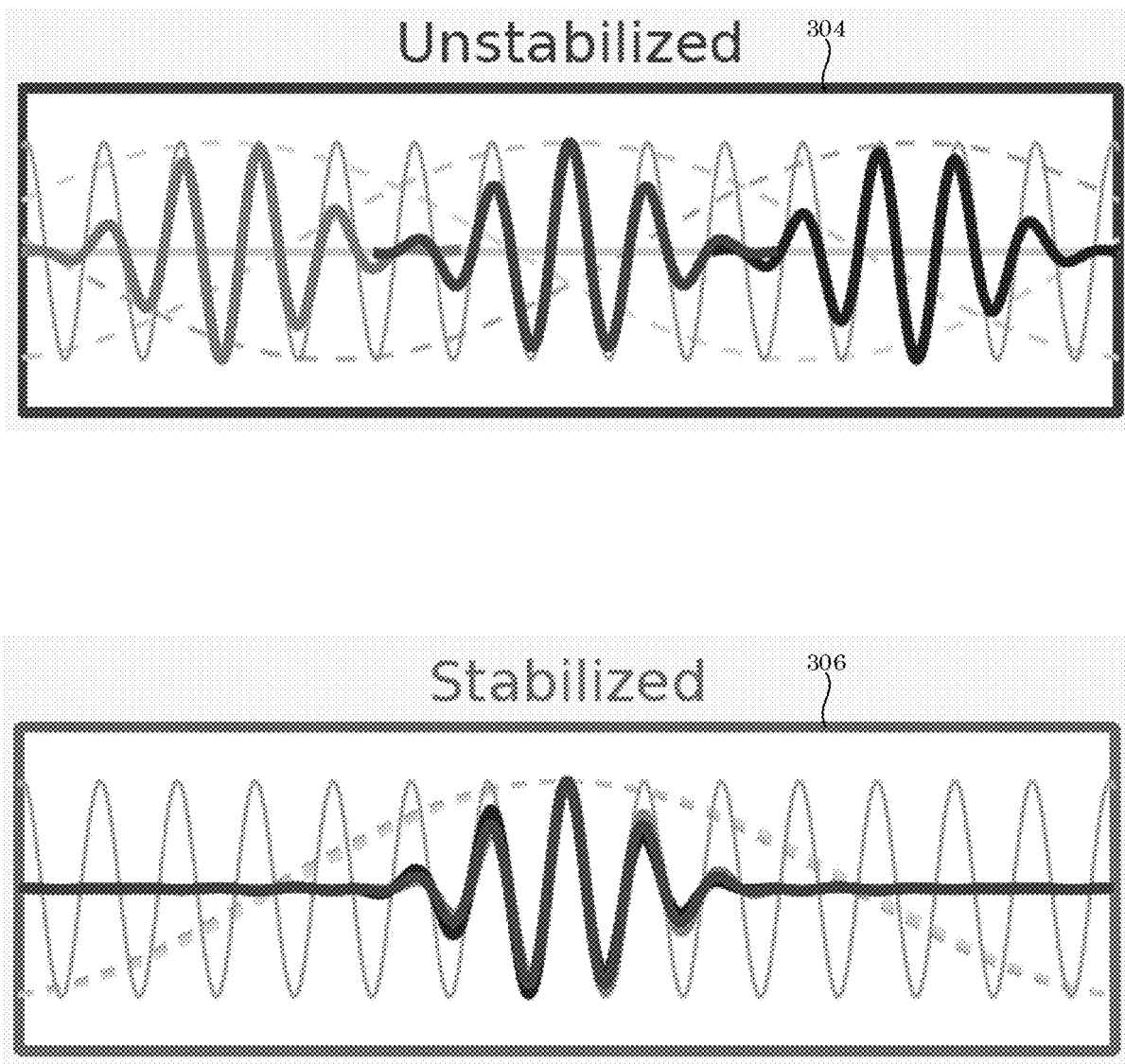
FIG. 3 shows a graph of intensity versus time for an un-stabilized comb in panel A and a stabilized comb in panel B.
Figure 4:
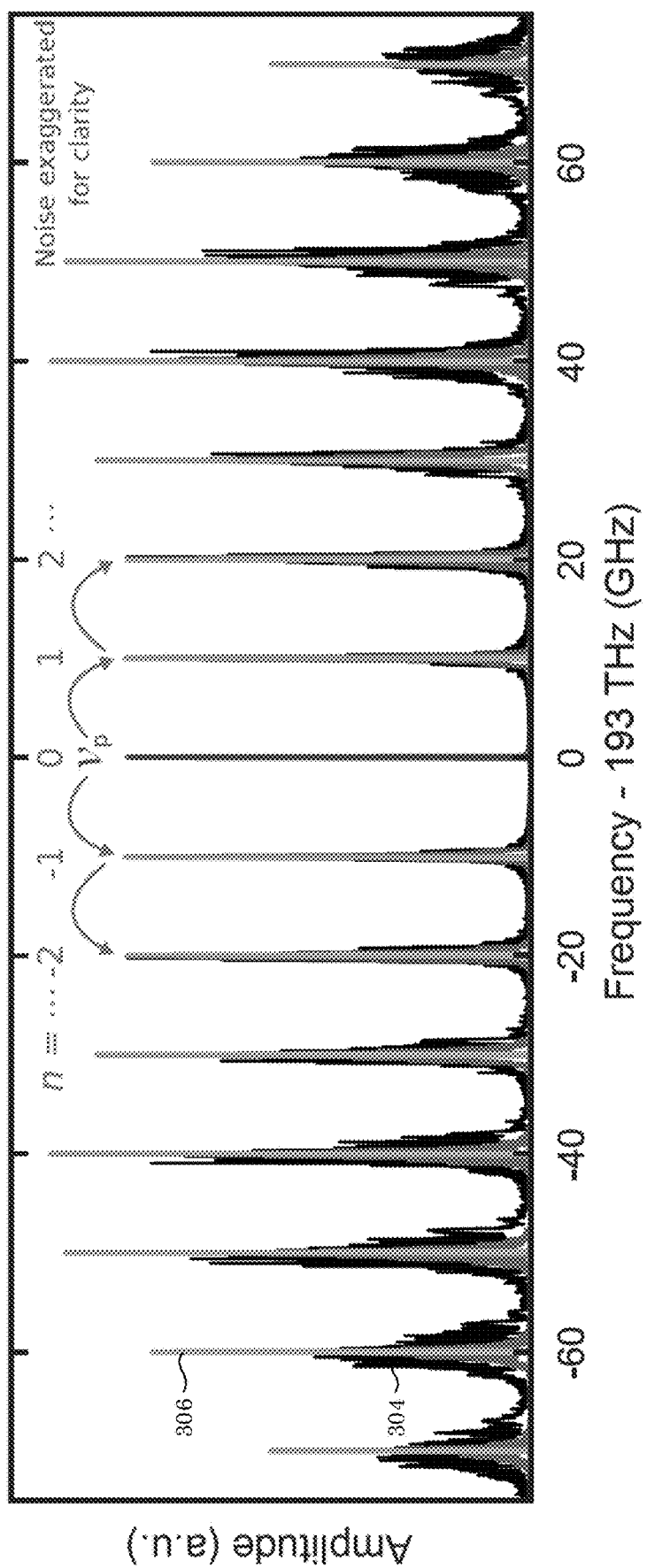
FIG. 4 shows a graph of amplitude versus frequency.
Figure 5:
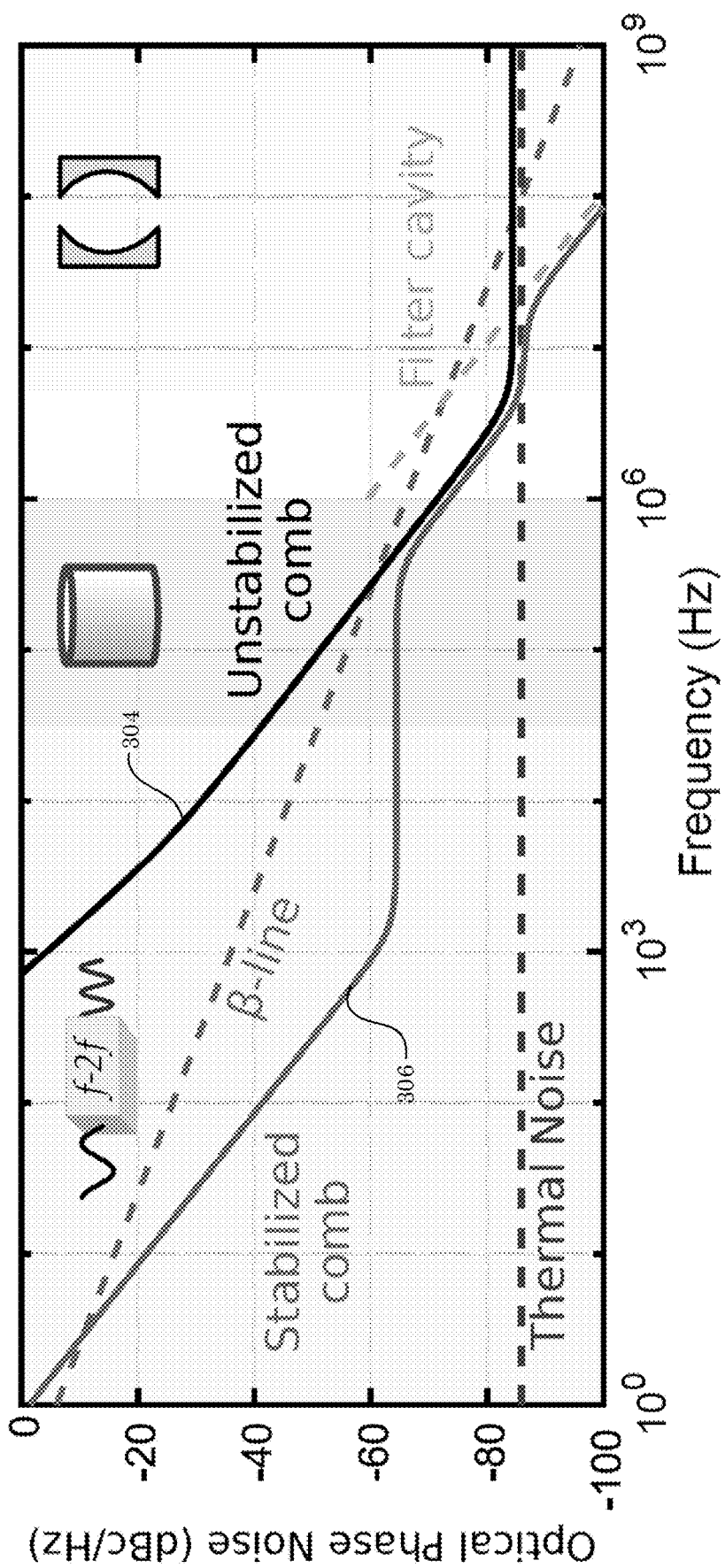
FIG. 5 shows a graph of optical phase noise versus frequency.

FIG. 1 shows carving femtosecond pulses from a continuous-wave (CW) laser with subcycle precision, wherein a chirped pulse train is derived from a 1550-nm CW laser by electro-optic phase and intensity modulation driven by a 10-GHz dielectric resonant oscillator (DRO) that is locked to a high-Q microwave cavity in the stabilized-local-oscillator (STALO) configuration. The pulse train is then optically filtered by a Fabry-Pérot cavity to suppress electronic thermal noise on the comb lines before spectral broadening in highly nonlinear fiber (HNLF) followed by a silicon-nitride waveguide. Octave-spanning spectra allow detection of the comb offset frequency in an f-2f interferometer that is used to stabilize the DRO output. FIG. 3 shows, that without stabilization, the microwave-derived pulse train exhibits large pulse-to-pulse timing jitter relative to the CW carrier. When the drive frequency is stabilized by feedback from the comb offset frequency and the STALO cavity, sub-optical cycle phase coherence between successive pulses is achieved. Stabilized pulses are shown with zero carrier-envelope offset. FIG. 4 shows, in a frequency-domain picture, the unstabilized comb exhibits large noise multiplication as the mode number n expands about zero. Mode filtering suppresses high-frequency thermal noise. The fully stabilized comb lines appear as δ-functions because the CW-laser stability is transferred across the entire comb bandwidth. FIG. 5 shows ab optical phase noise picture of the comb, showing the effects of the f-2f stabilization, STALO cavity, and filter cavity.

For the EOM comb to achieve ultrastable coherence between $v_p$ and $f_{eo}$, integrated phase noise of each mode is below π radians. In the temporal domain, this corresponds to subcycle timing jitter, and for EOM combs this requirement becomes more difficult to achieve as the comb bandwidth is increased because of microwave-noise multiplication. For octave-spanning spectra at a 10-GHz repetition rate, this multiplication factor is n'≈20,000 and corresponds to an 86-dB increase in phase noise. Thus, reaching the π-radian threshold with an EOM comb involves treatment of the noise at all Fourier frequencies.

Broadband thermal noise in the electronic components up to the Nyquist frequency causes the phase-coherence threshold to be exceeded. To compensate, a Fabry-Pérot cavity optically filters the broadband thermal noise fundamental to electro-optic modulation, resulting in a detectable carrier-envelope offset frequency. However, the cavity linewidth (typically a few megahertz) places a lower bound on the range of frequencies where this suppression is possible.

Figure 2:
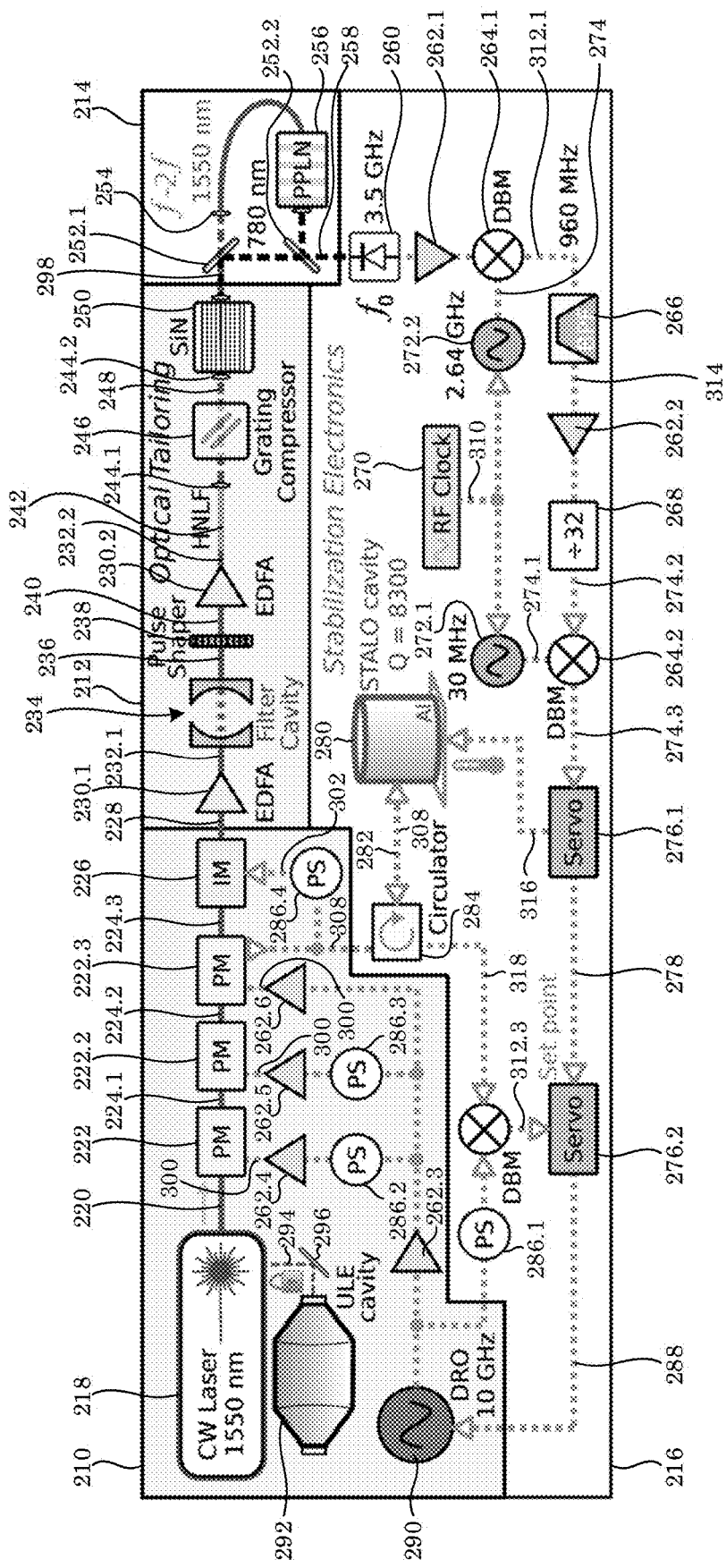
FIG. 2 shows an ultrafast electro-optic laser.

In the stabilized EOM comb, e.g., as shown in FIG. 2, a dielectric-resonator oscillator (DRO) has a nominal operating frequency of 10 GHz and 0.1% tuning range to drive the modulators.

With regard to FIG. 2, comb generation and stabilization includes fiber paths shown as solid lines; free-space paths shown as dashed lines; and electrical shown as gray dotted lines, wherein the following abbreviations or acronyms are used: ULE, ultra-low expansion cavity; PM, phase modulation; IM, intensity modulation; DRO, dielectric resonant oscillator; PS, phase shifter; EDFA, erbium-doped fiber amplifier; HNLF, highly nonlinear fiber; SiN, silicon-nitride waveguide; BPF, band-pass filter; DBM, double-balanced mixer; STALO, stabilized-local-oscillator cavity; and PPLN, periodically poled lithium niobate.

DRO output is amplified before driving phase modulators to produce comb spectra, e.g., as FIG. 6A.

Figure 6:
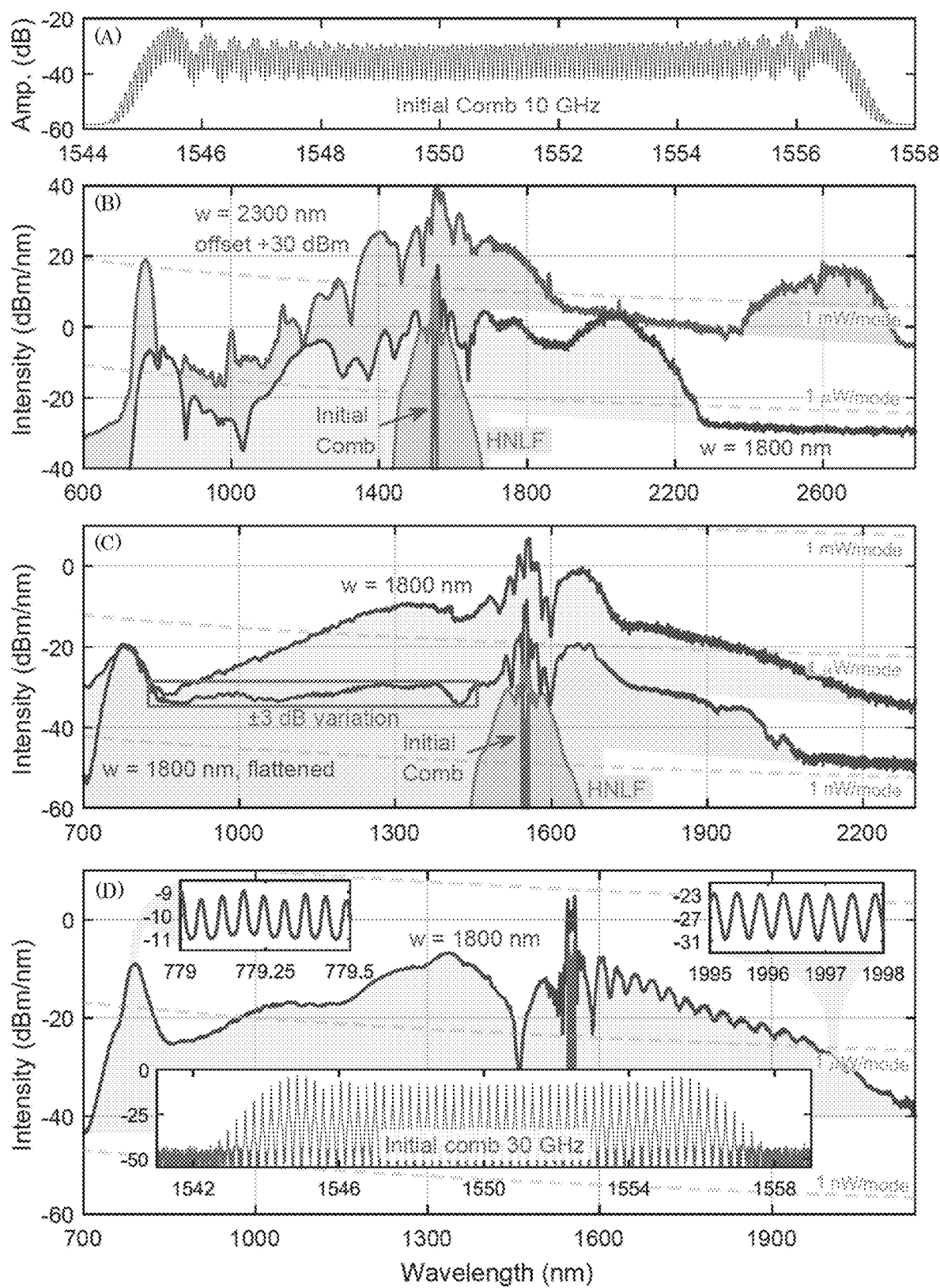
FIG. 6 shows a graph of amplitude versus wavelength in panel A, a graph of intensity versus wavelength in panel B, a graph of intensity versus wavelength in panel C, and a graph of intensity versus wavelength in panel D.

FIG. 6 shows high-repetition-rate supercontinuum for a (panel A) spectrum of the 10-GHz EOM comb directly after generation. Panel B shows a ten-gigahertz supercontinuum spectra spanning from 750 to 2750 nm for two different silicon-nitride waveguide widths. The spectral intensity is scaled to intrawaveguide levels. Also shown is the spectrum of the first-stage highly nonlinear fiber (HNLF). Panel C shows a ten-gigahertz supercontinuum optimized for spectral smoothness by reducing incident power (blue). Between 830 and 1450 nm, a flat spectrum (±3 dB) is produced by a single passive optical attenuator. Panel D shows a supercontinuum spectrum from a 30-GHz EOM comb. Top insets show that comb coherence is maintained across the entire spectrum (optical SNRs are spectrometer limited). Bottom inset shows initial spectrum of the 30-GHz EOM comb. They axes in both (C) and (D) show the power spectral density (PSD) obtained in the output fiber.

After transmission through an optical-filter cavity to suppress thermal noise, the chirped-pulse output of the EOM comb is compressible to durations as short as 600 fs, depending on the initial spectral bandwidth. Pulse durations greater than ~200 fs have been contemplated for coherent supercontinuum broadening in nonlinear media with anomalous dispersion. If the nonlinear material exhibits normal dispersion, broadening due to pure self-phase modulation is produces lower-noise spectra owing to the suppression of modulation instability. The ultrafast electro-optic laser includes two-stage broadening from a normal-dispersion highly nonlinear fiber (HNLF) to achieve initial spectral broadening and pulse compression to 100 fs followed by an anomalous-dispersion SiN waveguide for broad spectrum generation.

High-repetition rate lasers ($f_{rep} \geq 10$ GHz) produce lower pulse energies for the same average power, making it challenging to use nonlinear broadening to produce the octave bandwidths required for self-referencing. However, patterned nanophotonic waveguides have high nonlinearity and engineerable dispersion. Here, the ultrafast electro-optic laser has input-coupling efficiency with a SiN waveguide of up to 85% that enables a broadband supercontinuum to be generated with pulses from high-repetition rate ultrafast sources. The spectra generated with the 10-GHz EOM comb from the ultrafast electro-optic laser spans wavelengths from 750 nm to beyond 2700 nm for two different waveguide geometries (FIG. 6B), producing a total integrated power of ~1.1 W. Individual comb lines across the entire bandwidth exhibit a high degree of extinction (50 dB at 1064 nm; see FIG. 10 for data at 775, 1064, and 1319 nm) and do not exhibit any intermodal artifacts such as sidebands, a common problem when mode filtering is used to convert low-repetition rate combs to high repetition rates.

To investigate the scalability to even higher repetition rates, we made additional supercontinuum measurements using a 30-GHz EOM comb, which produced 600-fs, 70-pJ pulses (FIG. 6D). Despite the three-times reduction in pulse energy compared to the 10-GHz comb, similar broadband spectra are readily obtained. In both cases, if the waveguide input pulse energy is kept below ~100 pJ, smooth spectra can be obtained with high power per comb mode.

For applications with flat spectra over broad bandwidths, such as astronomical spectrograph calibration, supercontinuum light can be collected in a single-mode fiber and flattened with a single passive optical attenuator. Under these conditions, fluctuations in spectral intensity can be kept within ±3 dB over wavelengths spanning from 850 to 1450 nm while delivering more than 10 nW per mode in the fiber at 10 GHz. Improved waveguide-to-fiber output coupling, or free-space collimation combined with an appropriate color filter, could further improve the power per mode.

Figure 11:
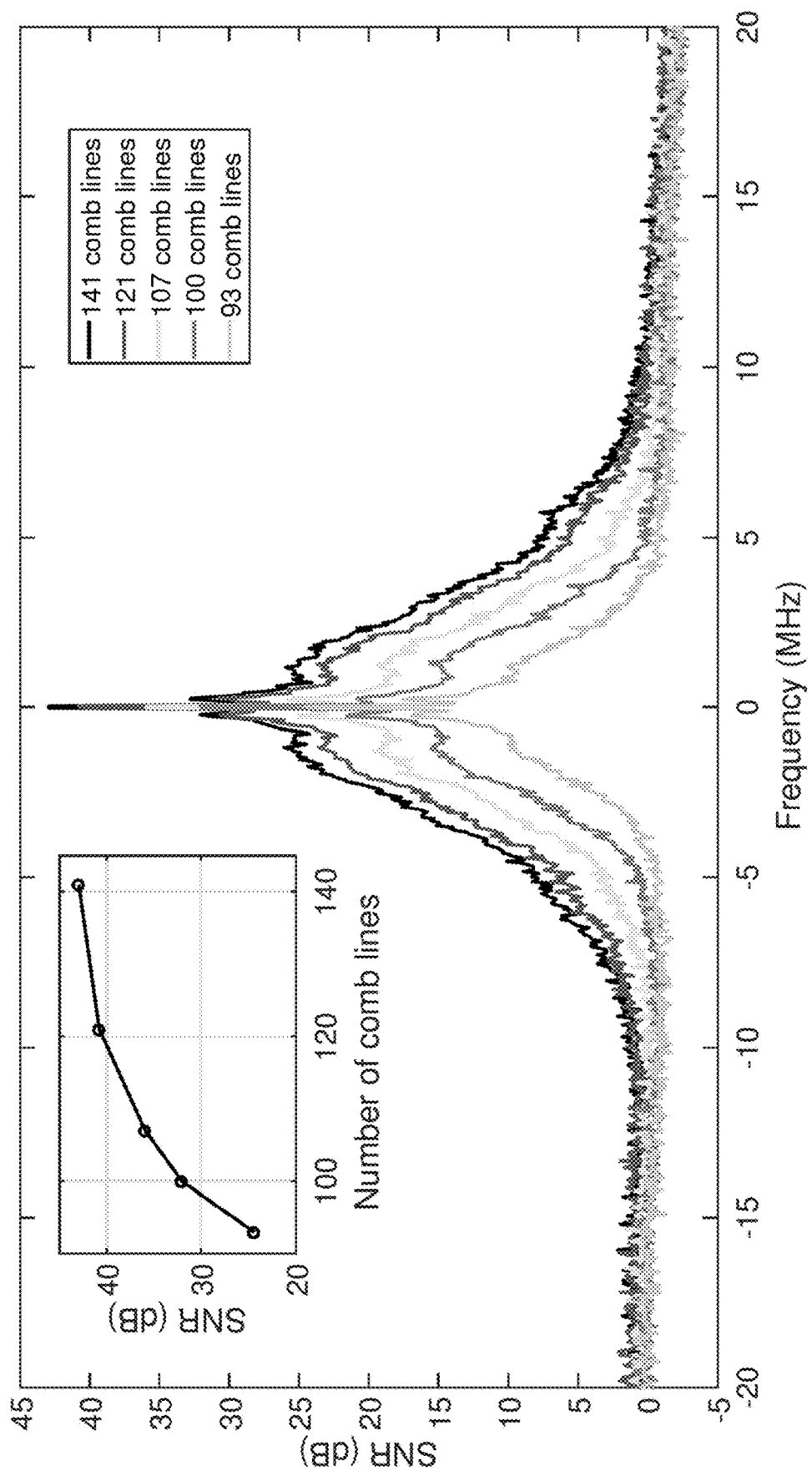
FIG. 11 shows a graph of signal-to-noise ratio versus frequency.

After broadening in the SiN waveguide, the offset frequency is detected with >30 dB signal-to-noise ratio (SNR), suggesting that the scheme of combining normal- and anomalous-dispersion media indeed allows us to overcome the difficulties of producing a coherent supercontinuum using pulses longer than a few hundred femtoseconds; see FIG. 11 for SNR versus bandwidth. Stabilization of $f_0$ is subsequently accomplished by feeding back to the frequency-tuning port of the DRO. However, owing to optical and electronic phase delay in this configuration, the feedback bandwidth is limited to ~200 kHz (FIG. 7A) and thus is insufficient on its own to narrow the comb linewidth set by the multiplied microwave noise of the DRO.

Figure 7:
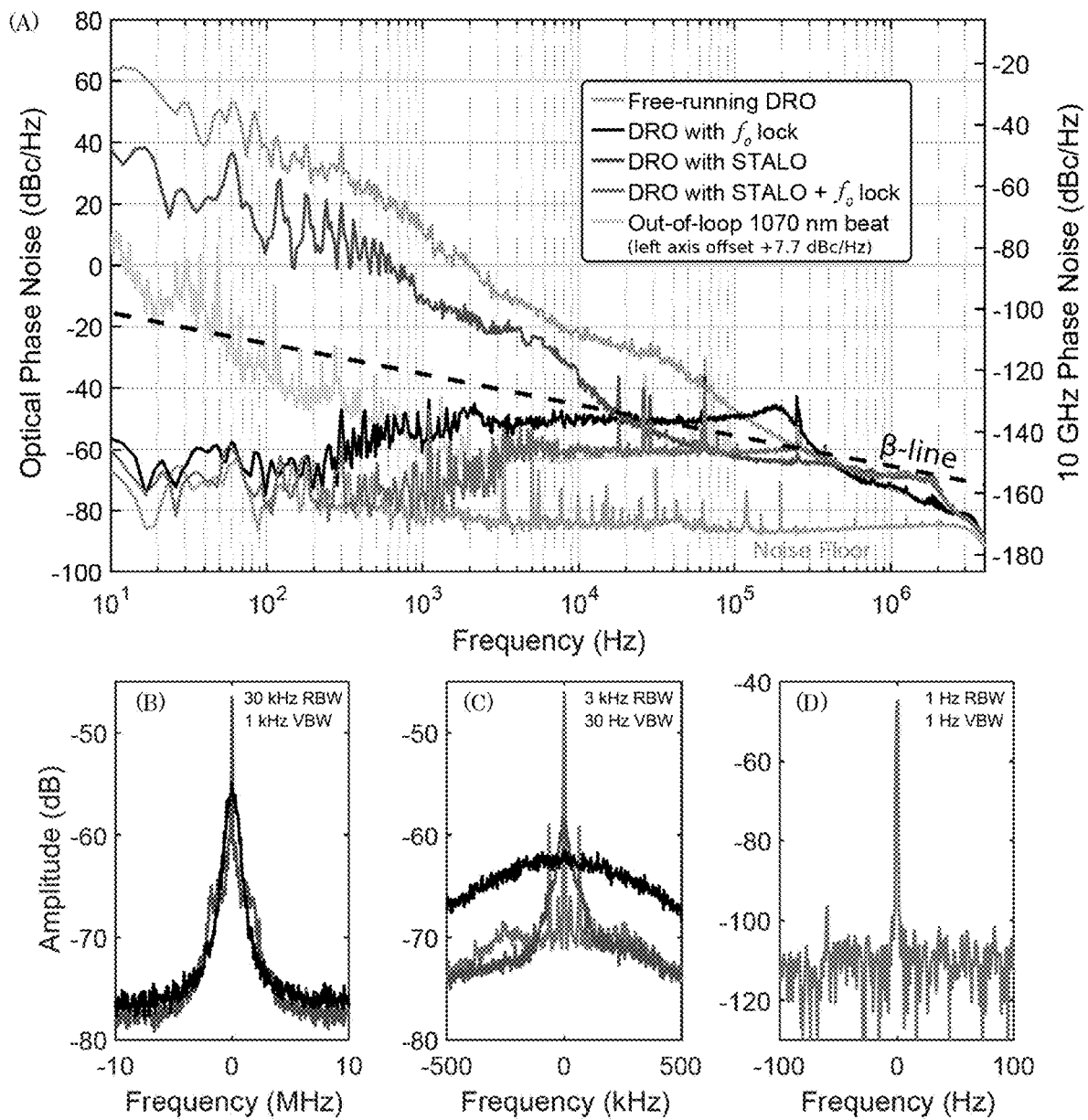
FIG. 7 shows graph optical phase noise in panel A and graphs of amplitude versus frequency in panels B, C, and D.

FIG. 7 shows aspects of EOM-comb phase noise. Panel A shows optical phase noise of the comb offset frequency measured at 775 nm (left axis) and scaled to the 10-GHz repetition rate (right axis) under different locking conditions. Prestabilizing the free-running RF oscillator (DRO) using a high-Q microwave cavity in the stabilized-local-oscillator (STALO) configuration lowers the phase noise by up to 20 dB at frequencies below 500 kHz. When servo feedback from the optical $f_0$ signal is engaged, a tight phase lock is achieved that suppresses low-frequency noise. The β-line indicates the level above which phase noise causes an increase in the comb linewidth. When both the STALO and $f_0$ locks are engaged, the phase noise remains below the β-line at all frequencies, indicating that the coherence of the CW pump laser is faithfully transferred across the entire comb spectrum. Panels B to D show $f_0$ RF beats with effects of each feedback loop. A coherent carrier signal is observed in panel D when both the STALO lock and direct $f_0$ feedback are engaged.

To reach the π-radian threshold for phase coherence between the CW laser and electronic oscillator, the output of one high-power microwave amplifier is stabilized to an air-filled aluminum microwave cavity in the stabilized-local-oscillator (STALO) configuration and yields an immediate reduction in phase noise of up to 20 dB at frequencies less than 500 kHz from the carrier.

In FIG. 7A, the β-line distinguishes between regimes where the linewidth of the comb offset $f_0$ is adversely affected (phase noise above the β-line) and where there is no linewidth contribution (phase noise below the β-line). Having phase noise below the β-line at all points is approximately equivalent to an integrated phase noise below π radians and provides a convenient visual way to assess the impact of noise at different Fourier frequencies. For the EOM comb from the ultrafast electro-optic laser, the $f_0$ phase noise remains below the β-line at all frequencies only when both the STALO lock and the f-2f lock are used in tandem. Under these conditions, noise arising from the microwave oscillator does not contribute appreciably to the comb linewidth and thus, the CW laser stability is faithfully transferred across the entire comb bandwidth. Equivalently, integrating the phase noise of the fully locked $f_0$ beat (1.17 rad, 10 Hz to 4 MHz) yields a pulse-to-pulse timing jitter of 0.97 fs (1.9 fs if limited by the β line between 4 MHz and 5 GHz), indicating that the microwave envelope coherently tracks the optical carrier signal with subcycle precision.

The progression of offset-frequency stabilization is also shown by the beat frequencies as each lock is turned on (FIG. 7, panel B to D). The coherent carrier seen in the offset frequency when fully stabilized (FIG. 7D) indicates that phase coherence has been achieved between individual comb lines across the entire available spectral bandwidth. The accuracy and precision of the stabilized EOM comb were determined by beating the 10-GHz repetition rate against the 40th harmonic of an independent mode-locked laser operating at 250 MHz. After 2000 s of averaging, a fractional stability of $3 \times 10^{-17}$ was obtained with no statistically significant frequency offset observed. This level of accuracy represents an improvement of more than three orders of magnitude over previously demonstrated EOM-comb systems and is likely only limited here by averaging time and out-of-loop path differences between the two combs.

To further show the versatility of the EOM comb as an ultrafast source, pulses were made that had durations lasting a few cycles of the optical field. Pulses in this regime provide direct access to the carrier-envelope phase and high peak intensities but require a well-controlled output spectrum exhibiting a high degree of spectral flatness and coherence. However, achieving such pulses at gigahertz repetition rates with mode-locked lasers is technically challenging. Still, high-repetition rate sources of few-cycle pulses could be valuable for applications like optically controlled electronics, where both fast switching speeds and peak intensity are important. Similarly, coherent Raman imaging of biological samples can benefit from transform-limited ultrashort pulses, but the acquisition speed for broadband spectra is typically restricted by the megahertz-rate mode-locked laser sources that are used. Extending to higher repetition rates could reduce measurement dead time and also prevent sample damage due to high peak powers.

Figure 8:
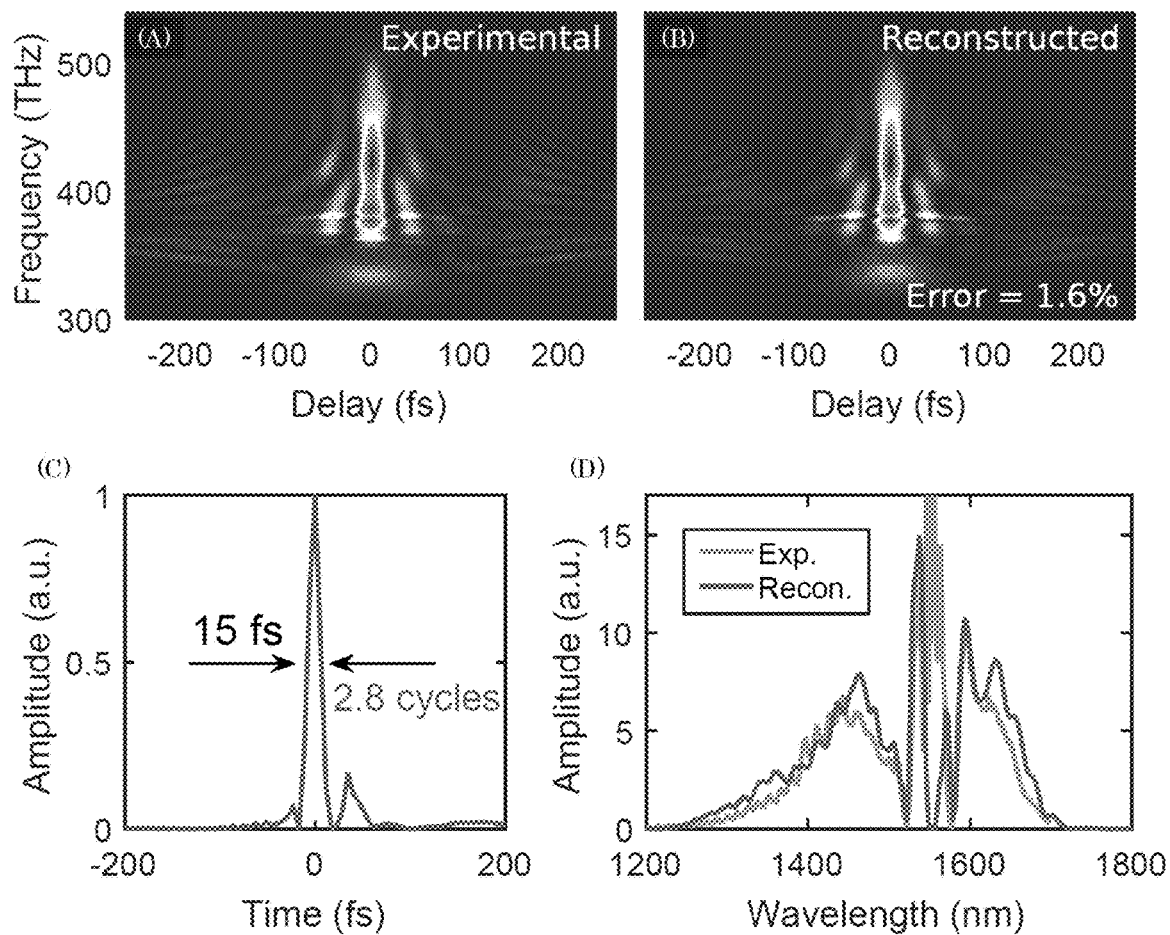
FIG. 8 shows a graph of frequency versus delay in panels A and B, a graph of amplitude versus time in panel C, and graph of amplitude versus wavelength in panel D.

The use of optical modulators to directly carve a train of ~1-ps pulses from a CW laser provides an effective method for generating clean few-cycle pulses thanks to the soliton self-compression effect. To achieve this, the pulse power and chirp incident on the SiN waveguide are adjusted such that the launched pulse approaches the threshold peak intensity for soliton fission near the output facet of the chip. A normal-dispersion single-element aspheric lens is then used to out-couple the light without introducing appreciable higher-order dispersion, and a 2-cm-long rod of fused silica glass recompresses the pulse to near its transform limit. FIG. 8 shows the reconstructed pulse profile obtained through frequency-resolved optical gating (FROG). Pulse durations of 15 fs (2.8 optical cycles, full width at half maximum) and out-coupled pulse energies in excess of 100 pJ (1 W average power) are readily achievable at a repetition rate of 10 GHz. With regard to FIG. 8, few-cycle pulse generation are shown for (panel A) experimental and (panel B) reconstructed FROG traces. Panel C shows a reconstructed temporal pulse profile with a full width at half maximum duration of 15 fs (2.8 optical cycles). Panel D shows a comparison of reconstructed and experimental spectra. The quasi-CW spectral wings of the initial comb spectrum near 1550 nm do not contribute appreciably to the pulse and thus are not seen in the reconstructed spectrum. At least 75% of the total optical power is concentrated in the compressed pulse. More sophisticated amplitude and phase compensation of the initial comb spectrum could allow an even larger fraction of the power to be compressed.

The combination of high-repetition rate pulse trains, ultrastable broadband frequency synthesis, few-cycle pulse generation, and extensible construction in our EOM-comb system provides a versatile ultrafast source with other additional practical benefits. For instance, these combs could also support further photonic integration through complementary metal-oxide-semiconductor (CMOS)-compatible modulators, alignment-free construction, the use of commercially available components, and straightforward user customization. Moreover, whereas the optical and microwave cavities currently limit the broad tuning capability of the repetition rate, the ~300 THz of comb bandwidth places a mode within 5 GHz of any spectral location in this range. By overcoming several experimental challenges related to broadening and stabilizing noisy picosecond-duration pulses, our techniques are widely applicable to existing technologies with demanding requirements, such as chip-based microresonators or semiconductor lasers.

Figure 9:
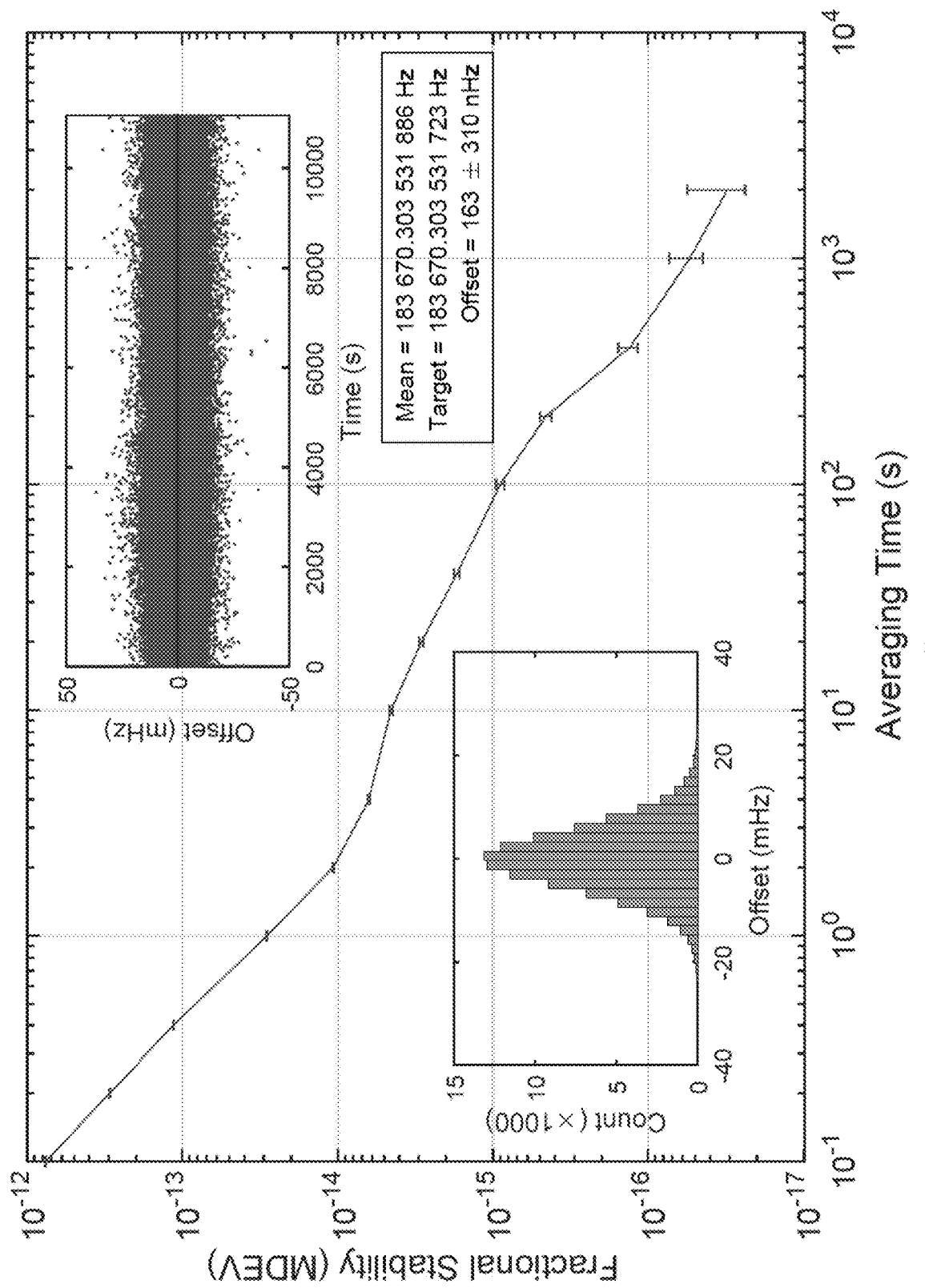
FIG. 9 shows a graph of fractional stability versus averaging time.

FIG. 9 shows frequency accuracy and stability for the ultrafast electro-optic laser. Here, modified Allan deviation (MDEV) had an out-of-loop frequency stability of the EOM comb frep measured against a separate self-referenced fiber comb with a two-sided 68% confidence intervals at each $\tau$ are calculated using $\chi^2$ statistics. The top inset shows 11,000 s of frequency-counter data from which the MDEV curve was calculated (expected frequency subtracted), and the bottom inset shows a histogram of the data. The minimum MDEV uncertainty of $3.1 \times 10^{-17}$ at $\tau=2,000$ s implies there is no statistical offset in the frequency synthesis of the comb.

The ultrafast electro-optic laser for production of 10-GHz EOM comb, including both the optical and microwave stabilization components, is shown in FIG. 2 Here, a central mode of the EOM comb is formed from a 1550-nm CW laser that is stabilized with sub-hertz linewidth to an ultra-low expansion cavity. For maximal frequency tunability though, the comb can also be operated successfully with an external-cavity diode laser as the pump. The CW laser is then transmitted through two to four lithium-niobate phase modulators with low half-wave voltage (V$\pi \approx$3 V), optically connected in series, to produce a periodically chirped continuous waveform. The total number of modes generated by a single-phase modulator is determined by the microwave drive power and the modulator's half-wave voltage, though multiple modulators can be added in series with their microwave phases aligned to linearly increase the number of modes. In this case, at the highest drive power of 36 dBm, each modulator can make approximately 40 comb lines. An intensity modulator driven by the same microwave drive then carves the chirped output into a 50% duty-cycle pulse train that can be readily compressed to near the Fourier-transform limit using single-mode optical fiber, though a programmable pulse shaper is used here for ease of tunability. All components in the comb generator are polarization-maintaining for convenience and reliability. The comb output is then amplified with a single-mode erbium-doped fiber amplifier (EDFA, 25 dB gain, noise figure).

The optical filter cavity is a standard Fabry-Pérot filter with a free spectral range matched to the comb repetition rate and included two dielectric mirrors (99.9% reflectivity), each with a 1-m radius of curvature. No thermal, mechanical, or vacuum isolation is used. The rear surface of each mirror is antireflection coated and one mirror is glued to a piezoelectric transducer for length stabilization. Weak sidebands at 22 MHz are put on the comb by driving one of the comb's phase modulators in reverse via the RF output port. These sidebands are used to generate a Pound-Drever-Hall error signal for locking the cavity to the comb. The total fiber-to-fiber transmission of the cavity system is 75%.

The aluminum microwave cavity used to pre-stabilize the 10-GHz DRO has a cylindrical geometry and is operated in the TE011 mode with an unloaded Qfactor of 8300. The cavity was machined in-house, though we note that comparable commercial options are available. The RF output port of one optical phase modulator is used to provide a power of up to 30 dBm for coupling to the STALO cavity. By placing the cavity after this modulator, phase noise introduced by both the DRO and the amplifier can be suppressed. The cavity is operated in a nearly critically coupled regime in order to achieve the maximum carrier suppression (>30 dB) and frequency-discrimination sensitivity from the reflected signal. An error signal for locking the DRO to the cavity is generated by mixing this reflected signal with the original DRO output. Increasing the cavity Q or adding an additional low-phase-noise amplifier before the STALO mixer can improve the amount of phase-noise reduction that is achievable due to the enhanced sensitivity of the frequency-discrimination signal.

Following the filter cavity, the 10 GHz and 30 GHz pulse trains are amplified in an anomalous dispersion EDFA designed for sub-picosecond pulses (maximum output power 5 W, 45 dB gain, 5.8 dB noise figure) before undergoing two stages of nonlinear broadening. The first stage uses highly nonlinear fiber (HNLF) with normal dispersion at 1550 nm (D=−1.4 ps/nm/km) and is seeded with a total optical power of 3.7 W. The HNLF has a free-space output facet that is angle-cleaved to prevent back reflections and the output beam is then directed to a pair of high-transmission diffraction gratings (940 grooves/mm) to compensate the HNLF dispersion. Following the compressor, sub-100-fs pulses are delivered to the second-stage SiN waveguide with energies of approximately 150 pJ.

The photonic waveguides used for the second-stage broadening were made with a photonic damascene process and low-pressure chemical-vapor-deposition (LPCVD) SiN, are 15 mm in length, and have a thickness of 750 nm. For self-referencing, a waveguide width of 1800 nm is chosen to produce a dispersive wave near the second harmonic (775 nm) of the pump laser (1550 nm), though the spectrum is adjustable by changing this parameter. By doubling the pump laser in this way, the supercontinuum generation process is decoupled from the frequency doubling, resulting in very stable and reliable operation.

The waveguides have a fully oxide-clad (SiO2) geometry that serves to both protect the waveguide from contamination as well as likely improving the ability of the device to withstand sustained thermal loads when incident with up to several watts of optical power. Input coupling to the waveguide is accomplished using a molded-glass aspheric lens with a design wavelength of 1550 nm and a numerical aperture (NA) of 0.6 while output-coupling is achieved with a 0.85-NA visible-wavelength microscope objective. Both facets of the chip include inverse tapers (minimum dimension=150 nm, length 300 μm) for improved coupling to achieve a total power throughput greater than 70%.

As shown in panel C of FIG. 6, spectral flattening of the waveguide output can be accomplished using a passive in-line fiber attenuator with a fixed 20-dB attenuation coefficient at 1550 nm. Due to an exponential roll-off in the attenuation coefficient in going to shorter wavelengths, a flatness of ±3 dB is achieved spanning from 850 nm to 1450 nm.

A fiber-coupled waveguide PPLN is used for second-harmonic generation of residual 1550-nm pump light (100 mW) exiting the SiN waveguide for f-2f detection. The PPLN output is temporally and spatially overlapped with the 775-nm supercontinuum light, coupled to single mode fiber, and delivered to a 10-GHz-bandwidth photodetector with a built-in trans-impedance amplifier. The offset frequency of the comb must match the intrinsic offset frequency of the filter cavity in order to be transmitted efficiently. A beat frequency is detected near 3.5 GHz and is determined by the exact cavity geometry and mirror dispersion. However, the ~3 MHz cavity linewidth still supports a tuning range of a few-hundred megahertz for the offset while maintaining high transmission of the comb. After detection, this beat is electronically mixed down to 960 MHz before filtering and frequency division by 32. A phase-locked loop locks the resulting 30-MHz signal to an RF synthesizer by adjusting the voltage set point of the microwave cavity lock. An integrated version of the main feedback loop's output voltage is also used to provide a slow thermal correction to the microwave cavity through resistive heaters affixed to the outside.

The phase noise of the comb is obtained via the photo detected offset frequency at 775 nm. At this wavelength, the RF noise of the electronics that drive the comb generation is multiplied by a factor of N=19340 (the number of comb lines away from the CW pump laser) and thus provides a sensitive way to calculate the noise on the 10-GHz repetition rate. The measured phase noise of the optical beat can then be reduced by a factor 20 log 10(N)=85.7 dB to obtain the estimated microwave noise. The resulting curve is integrated to compute the RMS timing jitter of the electronic oscillator, and the optical pulse train that is directly derived from it. This integration (from 10 Hz to 4 MHz) yields a total jitter of 0.97 fs relative to the 1550-nm optical carrier for the fully locked 10 GHz comb.

To confirm that noise up to the 5-GHz Nyquist limit does not adversely contribute to the pulse stability, use the β-line. If the timing-jitter calculation is assumed to be β-line limited between 4 MHz and 5 GHz, the total integrated jitter becomes 1.9 fs, which is still less than half of an optical cycle at 1550 nm. However, because of the high signal-to-noise ratio (SNR) of the coherent carrier on the offset frequency, the noise is considerably less than the β-line in this frequency range and should not significantly affect the timing jitter beyond 4 MHz.

Figure 10:
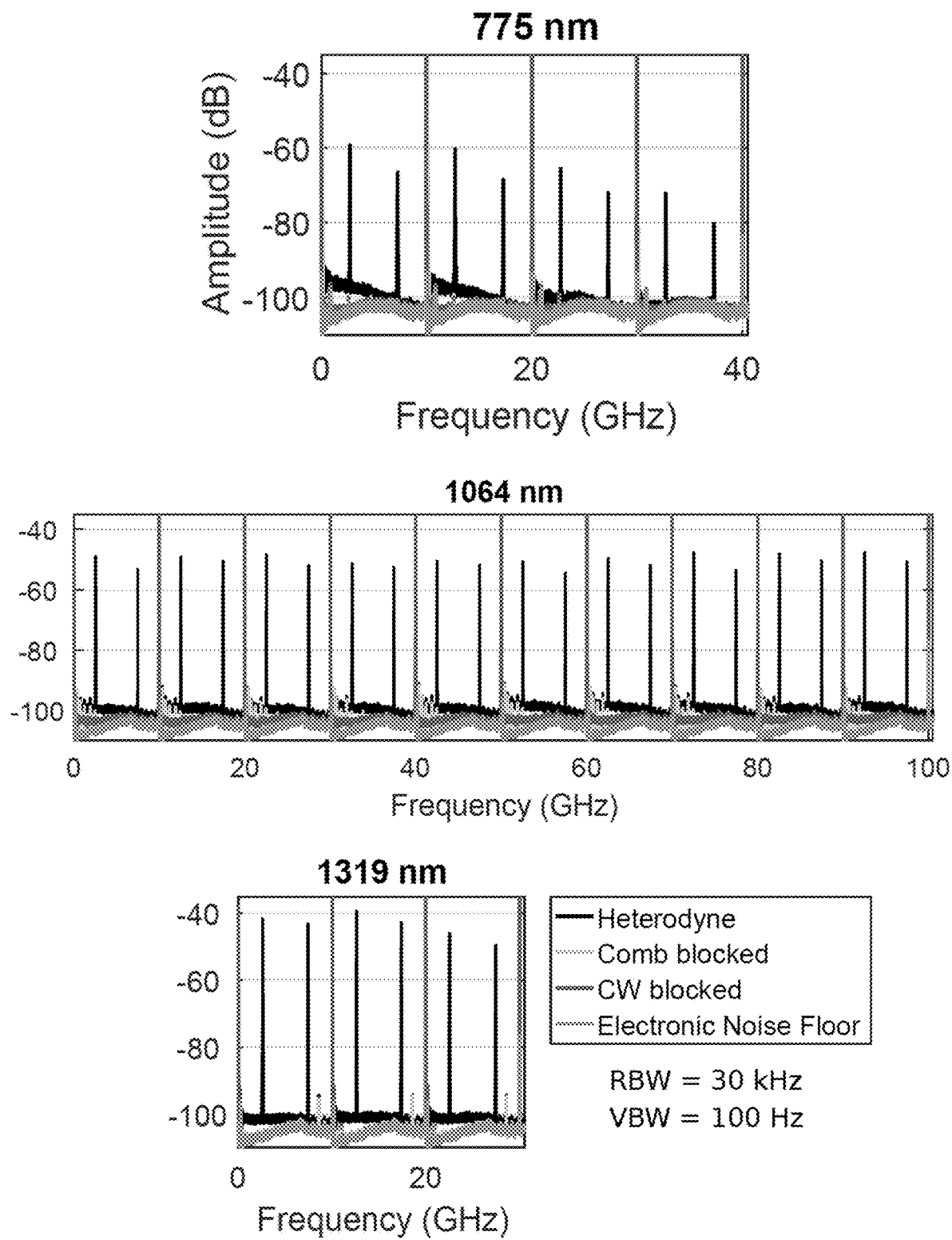
FIG. 10 shows graphs of amplitude versus frequency.

Individual comb lines in the silicon-nitride supercontinuum spectrum exhibit a degree of extinction across the entire bandwidth, as shown by the CW heterodyne beats in FIG. 10. With regard to FIG. 10, a high-resolution optical spectrum of the 10-GHz EOM comb was obtained from heterodyne beats with CW lasers. Clean, high-contrast comb modes are obtained across the entire bandwidth of the supercontinuum spectrum. The fall-off in signal-to-noise ratio in the 775-nm band at higher frequencies is due to reduced efficiency of the doubling crystal used to generate the CW light.

For each wavelength region shown, the spectra are obtained by stepping the frequency of a CW laser in 10 GHz increments and recording the down-mixed optical spectrum in the radio-frequency (RF) domain at each step. Bandwidths greater than 10 GHz are recorded by stitching together multiple acquisitions at each wavelength. Each individual 10 GHz span then contains a beat between the CW laser and the two nearest comb modes. Individual noise floor contributions from the CW laser and the comb are obtained at each wavelength by blocking the appropriate arm and recording a new trace.

Comb lines closest to the 1550-nm pump wavelength exhibit the highest degree of contrast (nearly 60 dB at 1319 nm). However, even at the edge of the spectrum near 775 nm, more than 35 dB of contrast is obtained. In all cases the spectra exhibit very clean modes without any visible inter-mode artifacts or sidebands.

Broad supercontinuum generation using narrow-bandwidth seed pulses poses challenges for low-noise performance. In conventional all-anomalous dispersion media, modulation instability can lead to noisy spectra and degradation of the comb coherence. The problem is mitigated by the first-stage broadening in normal-dispersion HNLF. FIG. 11 shows the offset-frequency beat notes as a function of EOM-comb bandwidth for the offset-frequency beat notes of the 10-GHz EOM comb as a function of the number of modes in the initial spectrum. Narrower-bandwidth comb spectra have reduced coherence after supercontinuum generation. The beat note pedestal results from residual microwave noise in the electronic oscillator and is a representation of the selected signal. The inset shows beat note SNR versus the number of initial comb lines, relative to the background noise floor.

Each curve in the plot is obtained by symmetrically filtering the initial comb spectrum in increasing amounts using a programmable pulse shaper. At each step, the amplifier power is adjusted to maximize the achievable SNR of the beat. The SNR increases monotonically with the number of comb modes, indicating it is advantageous to maximize the microwave drive power and the number of phase modulators for best performance.

An unexpected benefit of the ultrafast electro-optic laser is its inherent reliability. To generate absolute optical frequencies, the ultrafast electro-optic laser was continuously operated for more than 16 hrs. In this configuration, the cavity-stabilized pump source was replaced with a tunable external-cavity diode laser that was frequency-stabilized through feedback from the comb offset f0. The repetition rate, on the other hand, was generated by a low-noise microwave synthesizer, to which the DRO was phase locked. Both comb parameters were derived from an SI-second-referenced hydrogen maser and thus provide absolute calibration of the comb modes. FIG. 12A shows frequency counter data (gate time 1 s) of the in-loop comb offset frequency. No glitches are observed during the entire data set, indicating that neither temperature drifts nor beam-pointing fluctuations due to coupling watt-level powers to the SiN chip pose a significant obstacle for continuous operation.

Figure 12:
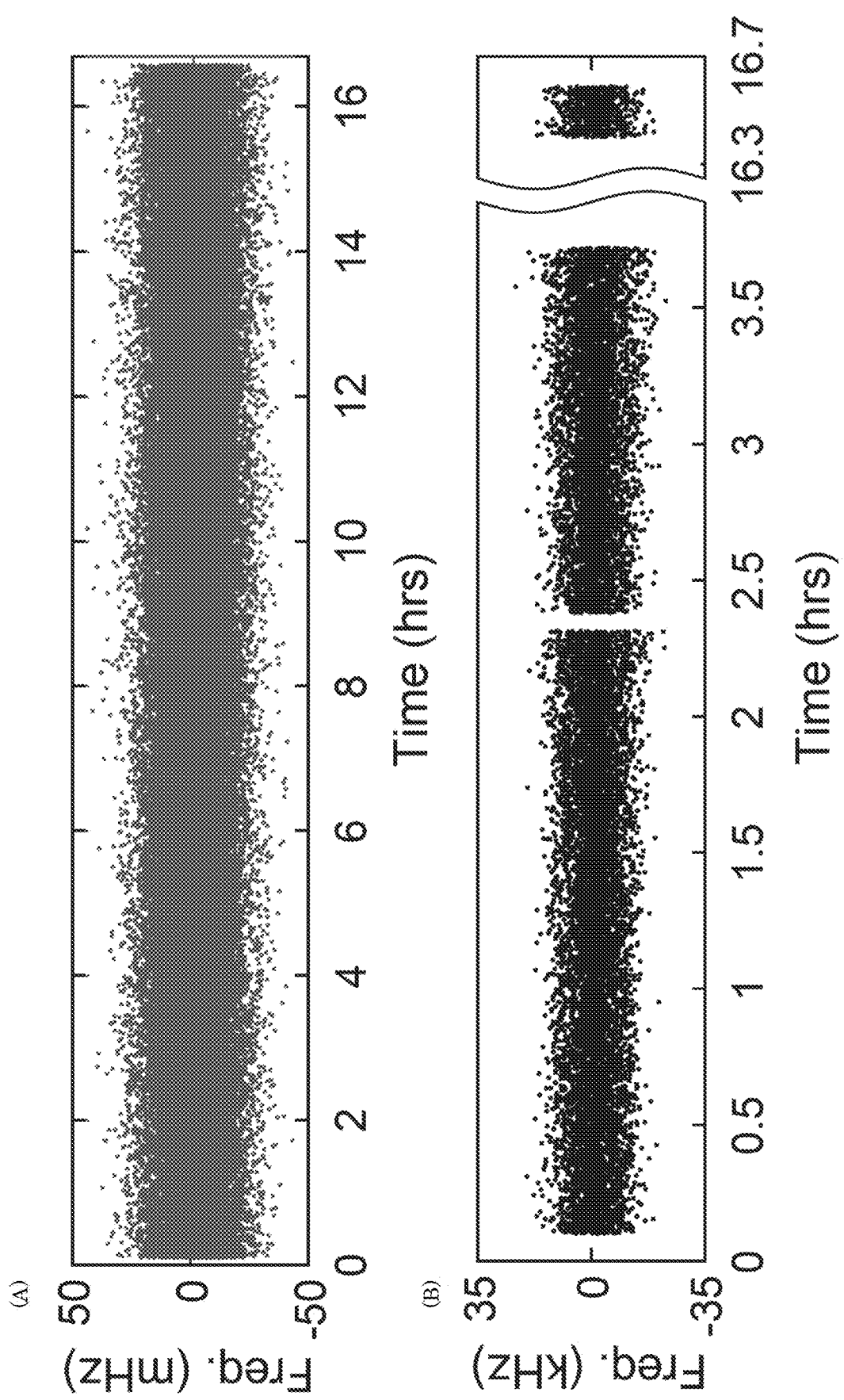
FIG. 12 shows graphs of frequency versus time in panels A and B.

The absolute frequency of the comb is verified during this same acquisition by counting a heterodyne beat between the EOM-comb pump laser and an independent self-referenced fiber frequency comb (FIG. 12B). Gaps in the record are due to the secondary comb exceeding the range of its stabilization actuators and losing phase lock. FIG. 12 shows reliable continuous operation, wherein panel A shows in-loop counter data for continuous glitch-free operation for more than 16 hrs (30 MHz set point subtracted). Panel B shows out-of-loop absolute frequency verification during acquisition (offset by expected value of 30.6 MHz). Time gaps in the data are due to the reference fiber comb losing phase lock.

For precision-measurement applications, the absolute accuracy and stability of the comb is an important metric for comb performance. To assess these aspects of the low-noise EOM comb from the ultrafast electro-optic laser, the 10-GHz repetition rate was compared against the 40th harmonic of an auxiliary self-referenced fiber comb operating at $f_{rep,aux}$=250 MHz. By phase locking the appropriate tooth of the reference comb to the same CW laser serving as the pump of the EOM comb, the drift of the CW laser can be completely canceled. The frequency difference between repetition rates fdiff, can then be counted with a frequency counter. The exact value of fdiff is defined solely in terms of the known RF-synthesizer set points and can be used to assess the absolute frequency synthesis accuracy of the comb without any data fitting or drift correction.

Again, FIG. 9 shows the measured stability of the difference in comb repetition rates after an acquisition time of 11,000 s.

A zero-dead-time counter (H-type) is used to record the RF beat between the two 10 GHz signals while the MDEV is used for the stability calculations. At short averaging times, τ<2 s, the measured stability is limited by the counter and the τ-3/2 slope is indicative of white phase noise for two mutually phase locked lasers. For 10<τ<100 s, differential noise in the system frustrates the phase coherent averaging, though this noise could be reduced by path-length cancellation of the optical paths, allowing the same degree of stability to be reached at shorter averaging times. At 2,000 s of averaging time, the MDEV yields a minimum uncertainty of $3.1 \times 10^{-17}$ (310 nHz) for a carrier frequency of 10 GHz. The measured 163-nHz frequency offset in the mean of the acquisition is statistically consistent with zero synthesis error at the demonstrated level of stability. As a result, the demonstrated combination of operational reliability and absolute accuracy may make the EOM comb is a tool for long-term measurements of ultra-stable optical frequencies and optical clock networks.

To determine the correct value of fdiff, the EOM-comb pump-laser frequency νp is first expressed in terms of f0 and frep for each comb:

$$\nu_p = f_0 + N f_{rep}$$

$$\nu_p = f_{0,aux} \alpha M f_{rep,aux} - f_a$$

where N and M are the mode numbers at the pump frequency for the EOM comb and auxiliary comb, respectively. fa is the frequency-offset set point used to phase lock the auxiliary comb to the CW laser.

Rewriting the comb equations in terms of the repetition rates yields:

$$f_{rep} = \frac{1}{N}(\nu_p - f_0)$$

$$f_{rep,aux} = \frac{1}{M}(\nu_p - f_{0,aux} + f_a).$$

Subtracting frep from the 40th harmonic of frep,aux yields an expression for fdiff in terms of the frequency set points, mode numbers, and pump frequency:

$$f_{diff} = 40 f_{rep,aux} - f_{rep} = \left(\frac{40}{M} - \frac{1}{N}\right)\nu_p + \frac{40}{M}(f_a - f_{0,aux}) + \frac{1}{N}f_0.$$

In the experiment, N=19339. Thus, by tuning the auxiliary comb such that M=40×N=773 560, the νp term is entirely canceled. Using the experimental values of fa=40 MHz, f0,aux=30 MHz, and f0=3542 MHz yields:

$$f_{diff} = \frac{1}{N}(f_a - f_{0,aux} + f_0) = 183670.303531723450 \text{ Hz}.$$

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. An ultrafast electro-optic laser for making a stabilized comb, the ultrafast electro-optic laser comprising
   a comb generator that produces a frequency comb and comprises:
      a dielectric resonant oscillator that:
         receives a stabilization signal; and
         produces a phase control signal from the stabilization signal;
      a phase modulator in communication with the dielectric resonant oscillator and that:
         receives continuous wave light;
         receives, from the dielectric resonant oscillator, a phase control signal;
         produces, from the continuous wave light and the phase control signal, phase modulated light; and
         produces a phase modulation signal;
      an intensity modulator in communication with the phase modulator and that:
         receives, from the phase modulator, the phase modulated light;
         receives an intensity control signal; and
         produces a frequency comb from the intensity control signal and the phase modulated light;

an optical tailor in communication with the comb generator and that produces tailored light, the optical tailor comprising:
a filter cavity in communication with the intensity modulator and that:
receives the frequency comb from the intensity modulator; and
produces filtered light from the frequency comb;
a pulse shaper in communication with the filter cavity and that:
receives the filtered light from the filter cavity; and
produces shaped light from the filtered light;
a highly nonlinear fiber and compressor in communication with the pulse shaper and that:
receives the shaped light from the pulse shaper; and
produces compressed light from the shaped light;
a waveguide in communication with the highly nonlinear fiber and the compressor and that:
receives the compressed light; and
produces the tailored light from the compressed light;
an interferometer in communication with the optical tailor and that produces a difference frequency from the tailored light, the interferometer comprising a frequency difference crystal that receives the tailored light; and
an electrical stabilizer in communication with the interferometer and the comb generator and that produces the stabilization signal, the electrical stabilizer comprising:
a stabilized local oscillator cavity that produces a stabilized local oscillator signal that is converted into the stabilization signal and communicated to the dielectric resonant oscillator.

2. The ultrafast electro-optic laser of claim 1, further comprising:
a continuous wave laser in communication with the phase modulator and that produces the continuous wave light.

3. The ultrafast electro-optic laser of claim 2, further comprising:
a lock cavity in communication with the continuous wave laser and that produces a lock signal to which the continuous wave laser is locked.

4. The ultrafast electro-optic laser of claim 1, further comprising:
a phase shifter in communication with the dielectric resonant oscillator and the phase modulator, electronically interposed between the dielectric resonant oscillator and the phase modulator, and that:
receives the phase control signal from the dielectric resonant oscillator; and
shifts a frequency of the phase control signal before the phase control signal is received by the phase modulator.

5. The ultrafast electro-optic, laser of claim 1, further comprising:
a phase shifter in communication with the phase modulator and the intensity modulator, electronically interposed between the phase modulator and the intensity modulator, and that:
receives the phase modulation signal from the phase modulator; and
shifts a frequency of the phase modulation signal to produce the intensity control signal from the phase modulation signal before the intensity control signal is received by the intensity modulator.

6. The ultrafast electro-optic laser of claim 1, further comprising:

an amplifier in communication with the intensity modulator and the filter cavity, optically interposed between the intensity modulator and the filter cavity, and that:
receives the frequency comb from the intensity modulator; and
amplifies the frequency comb to produce amplified light from the frequency comb before the frequency comb is received by the filter cavity as the amplified light.

7. The ultrafast electro-optic laser of claim 1, further comprising:
an amplifier in communication with the pulse shaper and the highly nonlinear fiber, optically interposed between the pulse shaper and the highly nonlinear fiber, and that:
receives the shaped light from the pulse shaper; and
amplifies the shaped light to produce amplified light from the shaped light before the amplified light is received by the shaped light as the amplified light.

8. The ultrafast electro-optic laser of claim 1, wherein the electrical stabilizer further comprises:
a filter in communication with the frequency difference crystal and that:
receives the difference frequency from the frequency difference crystal; and
passes only the difference frequency into the electrical stabilizer from the frequency difference crystal.

9. The ultrafast electro-optic laser of claim 8, wherein the electrical stabilizer further comprises:
a clock that produces a clock signal;
a first oscillator in communication with the clock and that:
receives the clock signal from the clock; and
produces a first oscillator signal from the clock signal; and
a first mixer in communication with the filter and the first oscillator and that:
receives the difference frequency from the filter;
receives the first oscillator signal from the first oscillator; and
produces a first mixed signal from the first oscillator signal and the difference frequency.

10. The ultrafast electro-optic laser of claim 9, wherein the electrical stabilizer further comprises:
a band pass filter in communication with the first mixer and that:
receives the first mixed signal from the first mixer; and
produces a band pass signal from the first mixed signal; and
a divider in communication with the band pass filter and that:
receives the band pass signal from the band pass filter; and
produces a second oscillator signal from the band pass signal.

11. The ultrafast electro-optic laser of claim 10, wherein the electrical stabilizer further comprises:
a second oscillator in communication with the clock and that:
receives the clock signal from the clock; and
produces a third oscillator signal from the clock signal; and
a second mixer in communication with the divider and the second oscillator and that:
receives the third oscillator signal from the second oscillator;
receives the second oscillator signal from the divider; and produces a fourth oscillator signal from the third oscillator signal and the second oscillator signal.

12. The ultrafast electro-optic laser of claim 11, wherein the electrical stabilizer further comprises:
a first servo in communication with the second mixer and that:
receives the fourth oscillator signal from the second mixer;
produces a servo signal and a set point from the fourth oscillator signal; and
communicates the servo signal to the stabilized local oscillator cavity, from which a temperature of the stabilized local oscillator cavity is controlled.

13. The ultrafast electro-optic laser of claim 12, wherein the electrical stabilizer further comprises:
a phase shifter in communication with the dielectric resonant oscillator and that receives the phase control signal from the dielectric resonant oscillator and shifts a frequency of the phase control signal before the phase control signal is received by a third mixer; and
the third mixer in communication with a circulator and the dielectric resonant oscillator via the phase shifter and that:
receives the phase control signal from the phase shifter;
receives a circulator signal from the circulator;
mixes the phase control signal and the circulator signal; and
produces a third mixed signal from the phase control signal and the circulator signal.

14. The ultrafast electro-optic laser of claim 13, wherein the electrical stabilizer further comprises:
a second servo in communication with the third mixer and the first servo and that:
receives the set point from the first servo;
receives the third mixed signal from the third mixer; and
produces the stabilization signal, which is communicated to the comb generator, from the set point and the third mixed signal.

15. A process for making a stabilized comb with an ultrafast electro-optic laser the process comprising:
producing, by a comb generator, a frequency comb by:
receiving, by a dielectric resonant oscillator, a stabilization signal; and
producing, by the dielectric resonant oscillator, a phase control signal from the stabilization signal;
receiving, by a phase modulator in communication with the dielectric resonant oscillator, continuous wave light;
receiving, by the phase modulator from the dielectric resonant oscillator, a phase control signal;
producing, from the continuous wave light and the phase control signal, phase modulated light; and
producing a phase modulation signal;
receiving, by an intensity modulator in communication with the phase modulator, the phase modulated light;
receiving, by the intensity modulator an intensity control signal; and
producing, the frequency comb from the intensity control signal and the phase modulated light;
producing, by an optical tailor in communication with the comb generator, tailored light by:
receiving, a filter cavity in communication with the intensity modulator, the frequency comb from the intensity modulator;
producing filtered light from the frequency comb;
receiving, by a pulse shaper in communication with the filter cavity, the filtered light from the filter cavity;
producing shaped light from the filtered light;
receiving, by a highly nonlinear fiber and compressor in communication with the pulse shaper, the shaped light from the pulse shaper;
producing compressed light from the shaped light;
receiving, by a waveguide in communication with the highly nonlinear fiber and the compressor, the compressed light; and
producing the tailored light from the compressed light;
producing, by an interferometer in communication with the optical tailor, a difference frequency from the tailored light with a frequency difference crystal; and
producing, by an electrical stabilizer in communication with the interferometer and the comb generator, the stabilization signal by:
producing, by a stabilized local oscillator cavity, a stabilized local oscillator signal;
converting the stabilized local oscillator signal into the stabilization signal; and
communicated the stabilization signal to the dielectric resonant oscillator to make the stabilization signal.

16. The process of claim 15, further comprising:
receiving, by a phase shifter in communication with the dielectric resonant oscillator and the phase modulator, the phase control signal from the dielectric resonant oscillator; and
shifting a frequency of the phase control signal before the phase control signal is received by the phase modulator.

17. The process of claim 15, further comprising:
receiving, by a phase shifter in communication with the phase modulator and the intensity modulator, the phase modulation signal from the phase modulator; and
shifting a frequency of the phase modulation signal to produce the intensity control signal from the phase modulation signal before the intensity control signal is received by the intensity modulator.

18. The process of claim 15, further comprising:
producing a clock signal;
producing a first oscillator signal from the clock signal;
producing a first mixed signal from the first oscillator signal and the difference frequency;
producing a band pass signal from the first mixed signal; and
producing a second oscillator signal from the band pass signal.

19. The process of claim 18, further comprising:
producing a third oscillator signal from the clock signal;
producing a fourth oscillator signal from the third oscillator signal and the second oscillator signal;
producing a servo signal and a set point from the fourth oscillator signal;
stabilizing a temperature of the stabilized local oscillator cavity;
shifting a frequency of the phase control signal;
mixing the phase control signal and a circulator signal; and
producing a third mixed signal from the phase control signal and the circulator signal.

20. The process of claim 19, further comprising:
producing the stabilization signal from the set point and the third mixed signal; and
communicating the stabilization signal to the comb generator.

* * * * *